United States Patent
Xin et al.

(10) Patent No.: US 11,889,556 B2
(45) Date of Patent: Jan. 30, 2024

(54) PRIORITIZED CHANNEL ACCESS

(71) Applicant: SONY GROUP CORPORATION, Tokyo (JP)

(72) Inventors: Liangxiao Xin, San Jose, CA (US); Mohamed Abouelseoud, San Francisco, CA (US)

(73) Assignees: SONY GROUP CORPORATION, Tokyo (JP); SONY CORPORATION OF AMERICA, New York, NY (US)

( * ) Notice: Subject to any disclaimer, the term of this patent is extended or adjusted under 35 U.S.C. 154(b) by 45 days.

(21) Appl. No.: 17/468,888

(22) Filed: Sep. 8, 2021

(65) Prior Publication Data

US 2022/0201756 A1    Jun. 23, 2022

Related U.S. Application Data

(60) Provisional application No. 63/126,585, filed on Dec. 17, 2020.

(51) Int. Cl.
*H04W 74/08* (2009.01)
*H04W 84/12* (2009.01)

(52) U.S. Cl.
CPC ... *H04W 74/0816* (2013.01); *H04W 74/0866* (2013.01); *H04W 84/12* (2013.01)

(58) Field of Classification Search
CPC ......... H04W 74/0816; H04W 74/0866; H04W 84/12
See application file for complete search history.

(56) References Cited

U.S. PATENT DOCUMENTS

| | | |
|---|---|---|
| 7,808,941 B2 | 10/2010 | Ramos |
| 2006/0268716 A1 | 11/2006 | Wijting |
| 2008/0056297 A1 | 3/2008 | Gaur |
| 2010/0150116 A1 | 6/2010 | Ji |
| 2015/0237654 A1 | 8/2015 | Park |
| 2016/0165637 A1 | 6/2016 | Kim |
| 2017/0245261 A1 | 8/2017 | Cariou |
| 2021/0144778 A1* | 5/2021 | Cherian ............ H04W 74/0875 |

OTHER PUBLICATIONS

Andrea Vesco et al: "Time-division access priority in SCMA/CA". IEEE 20th International Symposium on Personal, Indooe and Mobile Radio Communications (PIMRC 2009), IEEE, Piscataway, NJ, USA, Sep. 13, 2009 (Sep. 13, 2009), pp. 2162-2166. XP031659956. ISBN: 978-1-4244-5122-7 abstract section II-A. Operating Principles and Features; p. 1-p. 2.

(Continued)

*Primary Examiner* — James P Duffy
(74) *Attorney, Agent, or Firm* — O'BANION & RITCHEY LLP; John P. O'Banion

(57) ABSTRACT

A communication circuit and protocol for a wireless local area network (WLAN) using CSMA/CA and single EDCA and/or Multiple-User (MU) EDCA. EDCA functions are configured to operate with multiple sets of operating parameters providing a range of priority levels for altering on the fly the nominal access time for a STA sending prioritized packets. The STA then must switch to a lower-priority set of parameters as recompense so that channel usage remains fair.

20 Claims, 26 Drawing Sheets

(56) References Cited

OTHER PUBLICATIONS

Ashley Alex et al: "Alternate EDCA Parameter Set", Jan. 15, 2010 (Jan. 15, 2010), XP055898232, IEEE Mentor Retrieved from the Internet: URL https://mentor.ieee.org/802.11/dcn/10/11-10-0048-02-00aa-alternate-edca-parameter-set.ppt [retrievd on Mar. 7, 2022] p. 2, p. 8.
Chuyu Hu (Facebook Inc): "Prioritized EDCA Channel Access Over Latency Sensitive Links in MLO", IEEE Draft; 11-20-0408-06-00BE-Prioritized-EDCA-Channel-Access-Over-Latency-Sensitive-Links-In-ML, IEEE-SA Mentor, Piscataway, NJ USA, vol. 802.11 EHT; 802.11be, No. 6 Jun. 22, 2020 (Jun. 22, 2020), p. 1-29, XP068169649.

* cited by examiner

| Element ID | Length | QoS Info | Updated EDCA Info | AC_BE Parameter Record | AC_BK Parameter Record | AC_VI Parameter Record | AC_VO Parameter Record |

FIG. 1 (Prior Art)

| EDCA Parameter Set Update Count | Q-Ack | Queue Request | TXOP Request | Reserved |

FIG. 2 (Prior Art)

| AC/AIFSN | ECWmin/ECWmax | TXOP Limit |

FIG. 3 (Prior Art)

| Element ID | Length | Element ID extension | QoS Info | MU AC_BE Parameter Record | MU AC_BK Parameter Record | MU AC_VI Parameter Record | MU AC_VO Parameter Record |

FIG. 4 (Prior Art)

| AC/<br>AIFSN | ECWmin/<br>ECWmax | MU_EDCA<br>Timer |
|---|---|---|

| Element ID | Length | Element ID extension | QoS Info | Updated EDCA Info | HP Parameter Records | LP Parameter Records | AC HP Indication | AC LP Indication |
|---|---|---|---|---|---|---|---|---|

| AC_X Parameter Record | MU AC_X Parameter Record | AC_X HP-EDCA Timer |
|---|---|---|

| AC_X Parameter Record | MU AC_X Parameter Record | AC_X LP-EDCA Timer | AC_X Backoff Slot Duration |
|---|---|---|---|

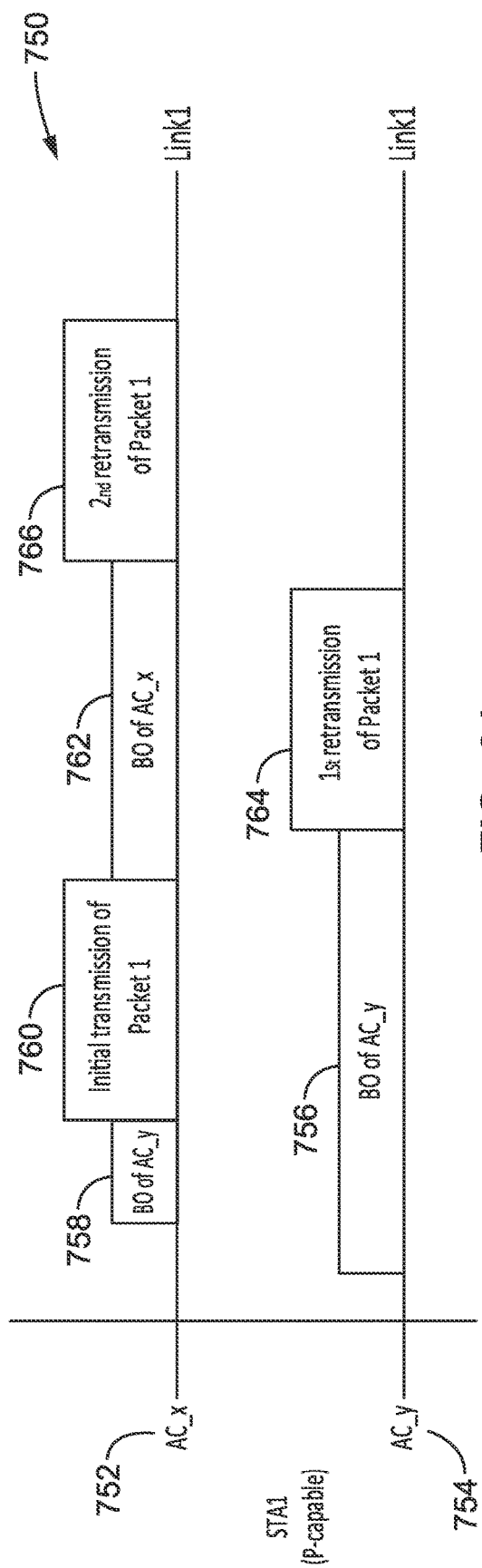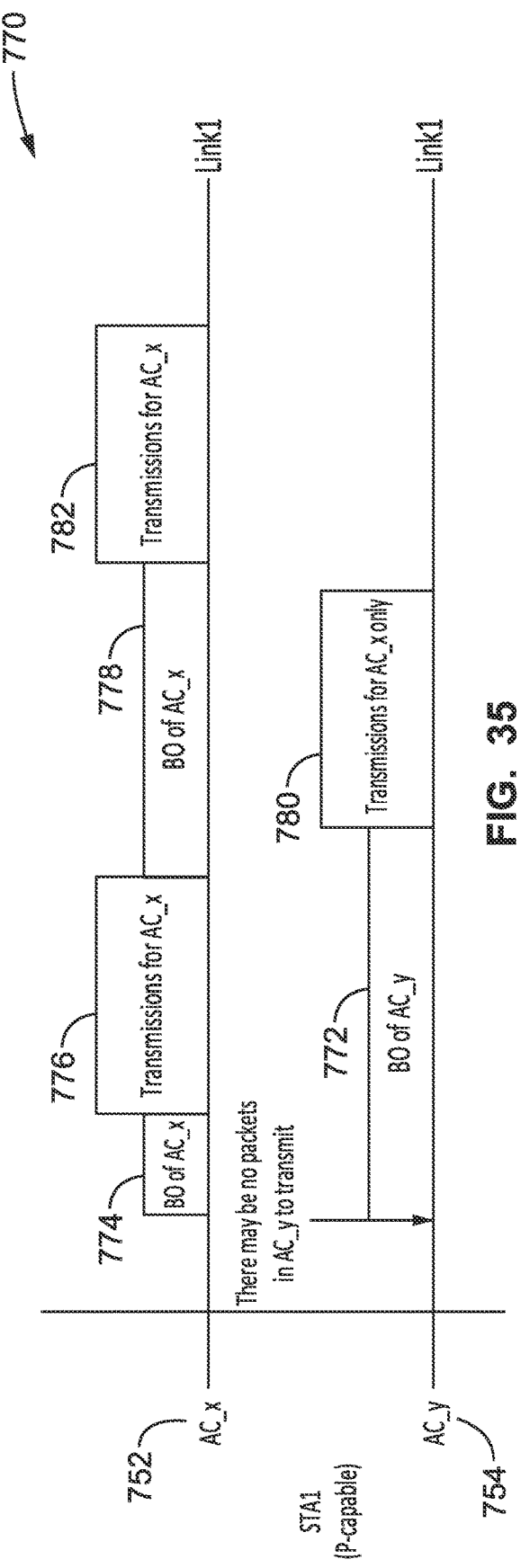
FIG. 34
FIG. 35

PRIORITIZED CHANNEL ACCESS

CROSS-REFERENCE TO RELATED APPLICATIONS

This application claims priority to, and the benefit of, U.S. provisional patent application Ser. No. 63/126,585 filed on Dec. 17, 2020, incorporated herein by reference in its entirety.

STATEMENT REGARDING FEDERALLY SPONSORED RESEARCH OR DEVELOPMENT

Not Applicable

NOTICE OF MATERIAL SUBJECT TO COPYRIGHT PROTECTION

A portion of the material in this patent document may be subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

1. Technical Field

The technology of this disclosure pertains generally to wireless local area networks under IEEE 802.11, and more particularly to CSMA/CA networks using EDCA in a manner to support Real Time Application (RTA) traffic.

2. Background Discussion

Current wireless technologies using CSMA/CA focus on high throughput performance of the network but lack low latency capability. However, an increasing number of applications, such as real time applications (RTAs), require low latency; thus a technology gap has arisen.

The RTAs require low latency communication and use best effort communication. The data generated from the RTA is called RTA traffic and will be packetized as RTA packets at the transmitter STA. Also, the data generated from the non-time sensitive application is called non-RTA traffic and will be packetized as non-RTA packets at the transmitter STA.

The RTA packet requires low latency due to its high timeliness requirement on packet delivery. The RTA packet is valid when it is delivered within a certain period of time.

The Enhanced Distributed Channel Access (EDCA) function of 802.11e defines multiple Access Categories (AC) with AC-specific Contention Window (CW) sizes, Arbitration Interframe Space (AIFS) values, and Transmit Opportunity (TXOP) limits to support MAC-level QoS and prioritization.

However, RTA operations are often compromised under EDCA type protocols, while RTA based protocols can be unfair to non-RTA wireless devices.

Accordingly, a need exists for an EDCA based protocol which provides improved RTA performance without unduly compromising non-RTA throughput levels. The present disclosure overcomes these issues and provides additional benefits over the previous technology.

BRIEF SUMMARY

This IEEE 802.11 WLAN protocol is configured for allowing a device to maintain multiple sets of Enhanced Distributed Channel Access (EDCA) and Multi-User (MU) EDCA parameters. By changing the parameters of an Access Category (AC), the nominal channel access time of that AC can be increased or decreased compared with its priority of using the default parameter setting. The wireless device is able to switch between the EDCA and MU EDCA parameter settings with respect to time toward increasing or decreasing nominal channel access time for each AC.

Changes to the nominal channel access time of an AC is primarily driven in at least one embodiment based on a consideration of fairness issues. More specifically, when access time for an AC of a wireless device is shortened by a period of time, then its channel access time should also be increased for another period of time, thus a sort of give-and-take occurs. When an AC of a wireless device shortens its channel access time, the other AC of the same wireless device can increase their channel access at the same time.

Further aspects of the technology described herein will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWING(S)

The technology described herein will be more fully understood by reference to the following drawings which are for illustrative purposes only:

FIG. 1 is a data field diagram of an EDCA parameter set element defined in IEEE 802.11.

FIG. 2 is a data field diagram of a QoS Information field when sent by the AP as defined in IEEE 802.11.

FIG. 3 is a data field diagram of an AC_X Parameter Record field as defined in IEEE 802.11.

FIG. 4 is a data field diagram of a MU EDCA parameter set element defined in IEEE 802.11.

FIG. 13 is a data field diagram of a priority EDCA parameter set element, according to at least one example of the present disclosure.

FIG. 14 is a data field diagram of a High-Priority (HP) Parameter Record subfield for an AC, according to at least one example of the present disclosure.

FIG. 15 is a data field diagram of a Low-Priority (LP) Parameter Record subfield for an AC, according to at least one example of the present disclosure.

FIG. 34 is a communication sequence diagram of a STA using multiple EDCA Functions (EDCAFs) for a single packet transmission, according to at least one embodiment of the present disclosure.

FIG. 35 is a communication sequence diagram of a STA using multiple EDCAFs for transmitting packets from one AC, according to at least one embodiment of the present disclosure.

DETAILED DESCRIPTION

1. Introduction

Figures 5, 6:
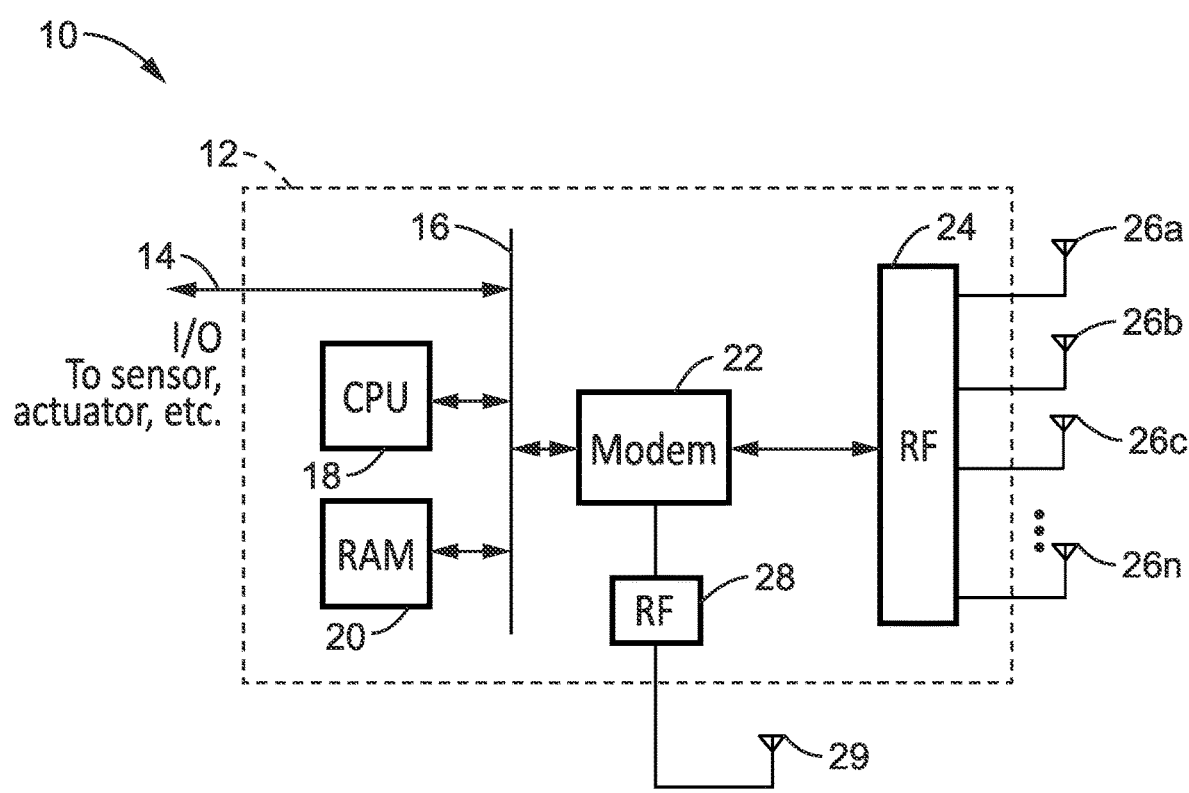
FIG. 5 is a data field diagram of a MU AC_X Parameter Record field as defined in IEEE 802.11.
FIG. 6 is a hardware block diagram of wireless station hardware according to at least one embodiment of the present disclosure.

Obtaining both high throughput and low latency may not be simultaneously attainable in a given network. Towards satisfying the differing requirements of RTA packets and non-RTA packets, the disclosed protocol utilizes some features to improve its low latency performance when transmitting RTA packets while at other times utilizes other features to maximize throughput when transmitting non-RTA packets.

Towards achieving these goals, the transmitter station (STA) requires the ability to discern between RTA traffic and non-RTA traffic. In some instances it is also possible that the receiver STA gains benefits from distinguishing between a RTA packet and a non-RTA packet, for example allowing the network to select between different features to separately satisfy the requirements of RTA and non-RTA traffic.

Most typically RTAs generate traffic periodically as connection-oriented communication. RTA connection-oriented communication established by an application between STAs is called an RTA session. It is possible that a STA can have multiple RTA sessions in the network, and it is important for the STA to manage those RTA sessions properly.

2. IEEE 802.11 Parameter Set Element

2.1. EDCA Parameter Set Element

FIG. 1 illustrates the format of an EDCA parameter set element defined in IEEE 802.11. An Element ID and Element ID extension field provide identification of the element to indicate this element is an EDCA parameter set element. A Length field indicates the length of the element. A QoS Info field is defined in IEEE 802.11 as shown in FIG. 2. An Updated EDCA Info field is defined in IEEE 802.11 and reserved for a non-sub 1 GHz (non-S1G STA). The next four fields have a subfield format which is shown in FIG. 3. An AC_BE Parameter Record field carries the EDCA parameters of AC_BE. An AC_BK Parameter Record field carries the EDCA parameters of AC_BK. An AC_VI Parameter Record field carries the EDCA parameters of AC_VI. An AC_VO Parameter Record field carries the EDCA parameters of AC_VO.

FIG. 2 illustrates the format of a QoS Info field when sent by an AP as defined in IEEE 802.11. An EDCA Parameter Set Update Count field indicates the version of the EDCA parameter set. If the non-AP STA receives this and it differs from the value the non-AP STA has stored, then the STA preferably updates the EDCA parameters according to the recent received EDCA parameter element. A Q-ACK field is set to a first state (e.g., "1") when dot11QAckOptionImplemented is set to a first state (e.g., "1"), and is otherwise set to a second state (e.g., "0") otherwise. It should be noted that dot11QAckOptionImplemented is a capability variable in IEEE P802.11REVmd_D5.0. Its value is determined by device capabilities. This attribute, when true, indicates that the station implementation is capable of interpreting the CF-ACK bit in a received frame with the Type subfield equal to Data even if the frame is not directed to the QoS station. The capability is disabled, otherwise. A STA is capable of interpreting the CF-ACK bit in a received Data frame if that station is the recipient of the Data frame, regardless of the value of this MIB attribute.

A Queue Request field is set to a first state (e.g., "1"), if the APs can process a nonzero queue size subfield in the QoS control field in QoS data frames; and is otherwise set to a second state (e.g., "0"). A TXOP Request field is set to a first state (e.g., "1") if the APs can process a nonzero TXOP Duration requested subfield in the QoS control field in QoS data frames, and is otherwise set to a second state (e.g., "0").

FIG. 3 illustrates the format of an AC_x Parameter Record field as defined in IEEE 802.11. An AC/AIFSN field indicates the access category (AC) of this field and the parameter set of the AIFSN. An ECWmin/ECWmax field indicates the minimum contention window (CW) size and maximum CW size of the AC. A TXOP limit field indicates the TXOP limit of the AC.

2.2. Multi-User EDCA Parameter Set Element

FIG. 4 illustrates the format of a MU EDCA parameter set element defined in IEEE 802.11. An Element ID and Element ID extension field provide identification of the element to indicate this element is a MU EDCA parameter set element. A Length field indicates the length of the element. A QoS Information (Info) field is defined in IEEE 802.11 as shown in FIG. 2. The subfield format for the remaining fields is shown in FIG. 5. A MU AC_BE Parameter Record field carries the MU EDCA parameters of AC_BE. A MU AC_BK Parameter Record field carries the MU parameters of AC_BK. A MU AC_VI Parameter Record field carries the MU EDCA parameters of AC_VI. A MU AC_VO Parameter Record field carries the MU EDCA parameters of AC_VO.

FIG. 5 illustrates the format of a MU AC_X Parameter Record field as defined in IEEE 802.11. An AC/AIFSN field indicates the access category (AC) of this field and the parameter set of the AIFSN during the MU_EDCA Timer. An ECWmin/ECWmax field indicates the minimum contention window (CW) size and maximum CW size of the AC during the MU_EDCA Timer. An MU_EDCA Timer field indicates the duration of time during which the STA uses the MU EDCA parameters for the AC.

2. Problem Statement

Current IEEE 802.11 devices use a single set of EDCA and MU EDCA parameters for channel contention. The priority of the channel access of each access category (AC) is set statically. For a STA, the AC with higher priority can access the channel earlier with higher probability than the AC with lower priority. However, a STA may need to shorten the nominal channel access time of a given AC for a period of time to transmit special traffic, such as traffic for real time applications (RTA). For example, when an AC contends for the channel for transmitting the RTA traffic, its nominal channel access time should be shortened to meet its timeliness requirement. When the AC does not have the RTA traffic to transmit, it does not have a special requirement for an expedited channel access time. That is, the wireless device may change the EDCA and MU EDCA parameters of the ACs over time dynamically, which cannot be achieved using a single set of EDCA or MU EDCA parameters.

3. Contribution of the Disclosure

The proposed technology allows each IEEE 802.11 device (STA) to maintain multiple sets of EDCA and MU EDCA parameters. By changing the parameters of an AC, the nominal channel access time of that AC can be increased or decreased compared with its priority of using the default parameter setting. The wireless device is thus able to switch between the EDCA and MU EDCA parameter settings over time to increase or decrease the nominal channel access time of each AC. The term nominal access time will be utilized from here on out and it should be appreciated that the value The proposed technology considers the fairness issue of shortening the nominal channel access time of an AC. There exist multiple options to solve the fairness issue, following are two examples.

In a first option, when an AC of a wireless device has its channel access time shortened for a period of time, then in another period of time its channel access time should be increased toward being fair (equitable).

In a second option, when an AC of a wireless device shortens its channel access time, then another AC of the same wireless device should increase its channel access time toward being fair (equitable).

4. Embodiments

4.1. Station Hardware Configuration

FIG. 6 illustrates an example embodiment 10 of STA hardware configured for executing the protocol of the present disclosure. An external I/O connection 14 preferably couples to an internal bus 16 upon which are connected a CPU 18 and memory (e.g., RAM) 20 for executing a program(s) which implement the communication protocol.

The host machine accommodates at least one modem 22 to support communications coupled to at least one RF module 24, 28 each connected to one or multiple antennas 29, 26a, 26b, 26c through 26n. An RF module with multiple antennas (e.g., antenna array) allows for performing beamforming during transmission and reception. In this way, the STA can transmit signals using multiple sets of beam patterns.

Bus 14 allows connecting various devices to the CPU, such as to sensors, actuators and so forth. Instructions from memory 20 are executed on processor 18 to execute a program which implements the communication protocol, which is executed to allow the STA to perform the functions of an access point (AP) station or a regular station (non-AP STA). It should also be appreciated that the programming is configured to operate in different modes (TXOP holder, TXOP share participant, source, intermediate, destination, first AP, other AP, stations associated with the first AP, stations associated with other AP, coordinator, coordinatee and so forth), depending on what role it is performing in the current communication context. Thus, the STA HW is shown configured with at least one modem, and associated RF circuitry for providing communication on at least one band, such as the sub-6 GHz band.

In addition, it will be noted that multiple instances of the station hardware as shown in the figure, can be combined into a multi-link device (MLD), which typically will have a processor and memory for coordinating the activity, while there is not always a need for a separate CPU and memory for each STA within the MLD.

Figure 7:
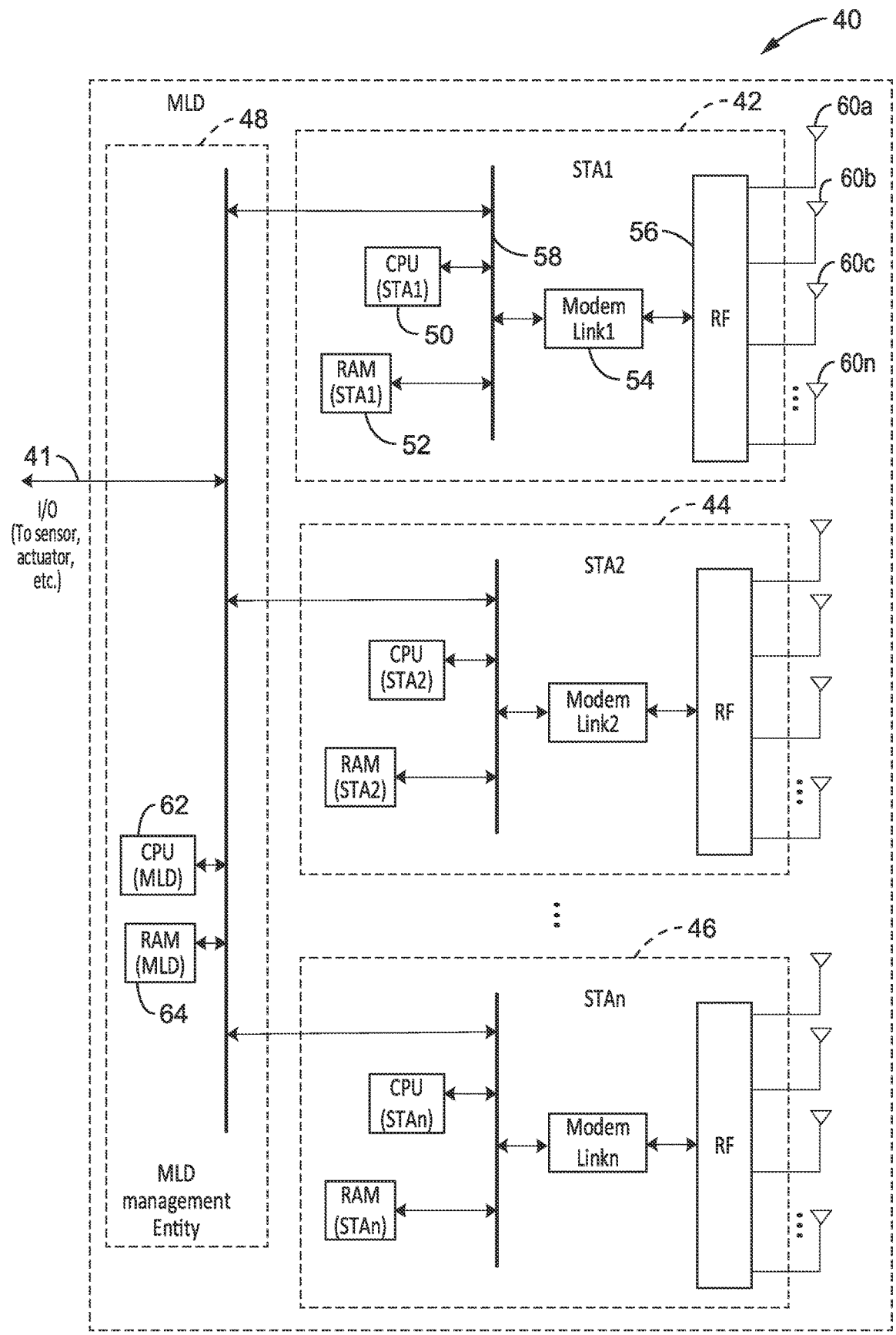
FIG. 7 is a hardware block diagram of a station configuration, such as contained in Multi-Link Device hardware, according to at least one embodiment of the present disclosure.

FIG. 7 illustrates an example embodiment 40 of a Multi-Link Device (MLD) hardware configuration. Multiple STAs are affiliated with an MLD, with each STA operating on a link of a different frequency. The MLD has external I/O 41 access to applications, this access connects to a MLD management entity 48 having a CPU 62 and memory (e.g., RAM) 64 to allow executing a program(s) that implement communication protocols at the MLD level. The MLD can distribute tasks to, and collect information from, each affiliated station to which it is connected STA 1 42, STA 2 44 through to STA N 46 and share information between affiliated STAs.

In at least one embodiment, each STA of the MLD has its own CPU 50 and memory (RAM) 52, which are coupled through a bus 58 to at least one modem 54 which is connected to at least one RF circuit 56 which has one or more antennas 60a, 60b, 60c through 60n. The present disclosure is primarily interested in the sub-6 GHz band with omni-directional antennas. The modem in combination with the RF circuit and associated antenna(s) transmits/receives data frames with neighboring STAs. In at least one implementation the RF module includes frequency converter, array antenna controller, and other circuits for interfacing with its antennas.

It should be appreciated that each STA of the MLD does not necessarily require its own processor and memory, as the STAs may share resources with one another and/or with the MLD management entity, depending on the specific MLD implementation. It should be appreciated that the above MLD diagram is given by way of example and not limitation, whereas the present disclosure can operate with a wide range of MLD implementations.

4.2. STA Topology for Consideration

Figure 8:
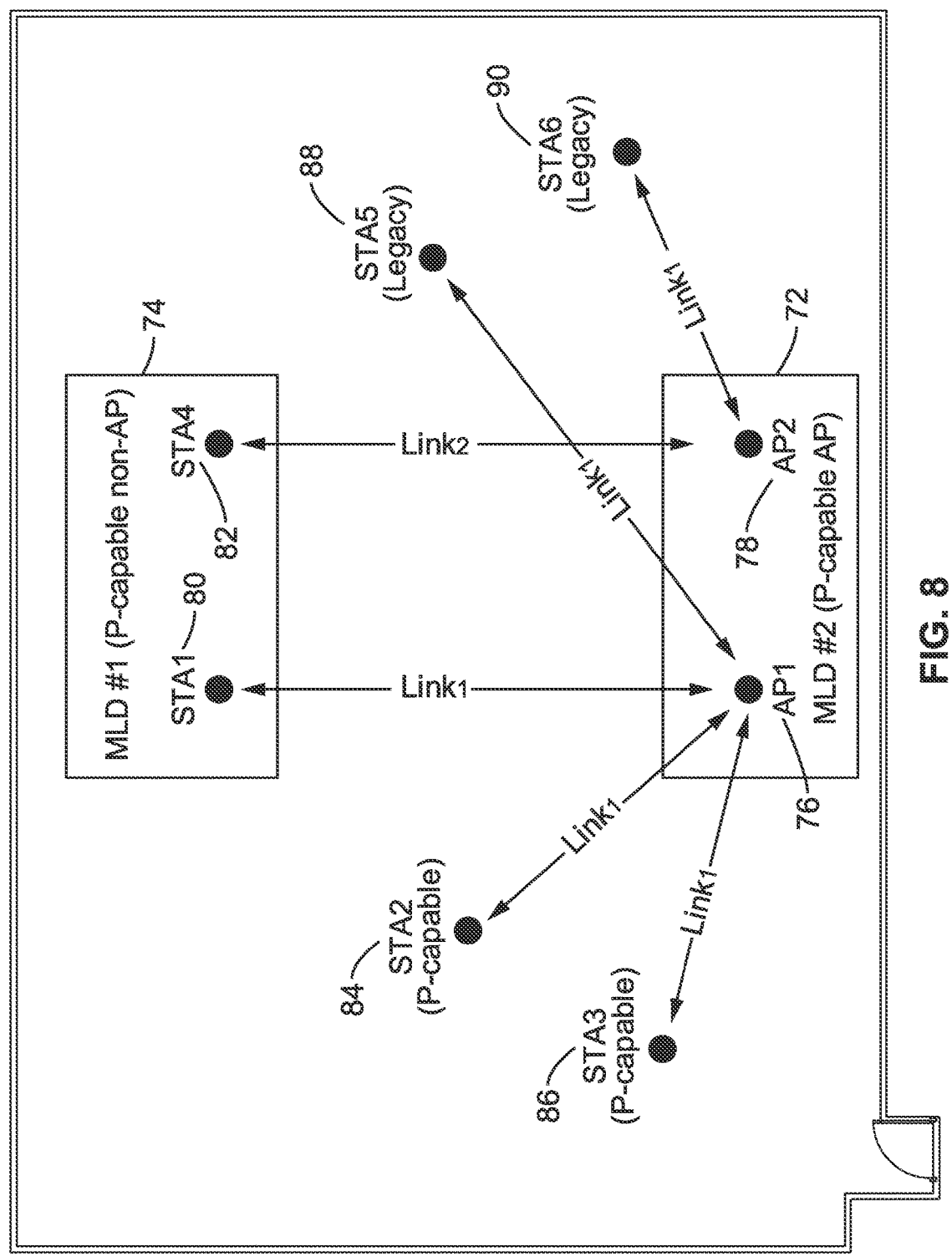
FIG. 8 is a topology of a WLAN having six STAs and two APs across two BSS according to at least one example of the present disclosure.

FIG. 8 illustrates an example embodiment 70 of a topology (network scenario), given by way of example and not limitation. The topology is provided solely to explain the goals of the proposed technology, not to limit it to a specific STA configuration. In this example case topology it is assumed there are 6 STAs and 2 APs across two BSSs given space (e.g., meeting room). Each STA and its associated AP can communicate with each other. Note that it is also possible that two BSSs are considered as the same BSS since the two APs of the two BSSs are affiliated with the same MLD.

A MLD is a device that has more than one affiliated STA and has one MAC service access point (SAP) to logical link control (LLC), which includes one MAC data service. In this example case it is assumed there are four STAs consisting two MLDs in the local area. STA1 80 and STA4 82 are affiliated with non-AP multi-link device (MLD) #1 74, and AP1 76 and AP2 78 are affiliated with AP MLD #2 72. STA1 and STA4 are associated with AP1 and AP2 over link1 and link2, respectively. STA2 84 and STA3 86 are shown for connecting to AP1 76 of MLD2 72. STA5 88 is shown with Link1 connecting to AP1 76, while STA6 90 is shown with Link1 connecting to AP2 78.

All STAs use CSMA/CA for random channel access. When a STA is P-capable, it is able to use multiple sets of EDCA parameters at different times; otherwise, it is regarded as a legacy device. As shown in the figure, the two APs and STA1 through STA4 are P-capable, while only STA5 88 and STA6 90 are considered legacy devices.

4.3. Prioritized Channel Access

The disclosed technology defines multiple EDCA and MU-EDCA parameter settings at a STA. These multiple sets of parameters provide a range of priority levels, such as a regular parameter set as well as one or more levels at a higher priority and one or more sets at a lower priority level. By way of example and not limitation, the multiple operating parameter sets are exemplified herein as Regular (Reg), High-Priority (HP), and Low-Priority (LP) settings.

A STA sets the Regular EDCA and MU-EDCA parameter setting as the single EDCA and MU-EDCA parameter setting in normal usage.

A STA sets the High-Priority (HP) EDCA and MU-EDCA parameter setting to expedite channel access as compared with using the regular EDCA and MU-EDCA parameter setting.

A STA sets the Low-Priority (LP) EDCA and MU-EDCA parameter setting to slow down channel access compared with regular EDCA and MU-EDCA parameter setting. Primarily the low-priority setting is utilized for keeping channel access fair between stations in the network.

The STA can switch between the EDCA and MU-EDCA parameter settings listed above dynamically to change channel access parameters for each AC. It should be noted that EDCA parameter settings and MU-EDCA parameter settings can be utilized/controlled independently.

In at least one embodiment, the disclosed technology also takes into account the fairness issue of changing EDCA and MU-EDCA parameters of the ACs. When a STA uses the High-Priority (HP) EDCA and MU-EDCA parameter setting of an AC to shorten its nominal channel access time for a period of time, it should (or is constrained to) also use the LP EDCA and MU-EDCA parameter setting of that AC to increase the nominal channel access time of that AC for another period of time toward providing a recompense (fair pay back), for its previously decreased channel access time. In addition, in at least one embodiment, the duration of time a STA can contiguously use the HP EDCA and MU-EDCA parameter setting of an AC is limited.

It should also be appreciated that in at least one embodiment the 'recompense' above, includes the ability to perform a 'precompense', in which a lower-priority operating parameter set is utilized prior to the higher-priority operating parameter set for which it is fully or partially precompensating for.

The disclosed technology uses the HP EDCA and MU-EDCA parameter setting to shorten nominal channel access time of certain types of traffic which are denoted as being prioritized traffic. When a packet carries prioritized traffic, it is denoted herein as being a prioritized packet.

4.3.1. Channel Access for P-capable STAs

The proposed technologies denote the following modes of the period (e.g., regular period, prioritized period, non-priority period) for each AC.

A Regular period of an AC is considered to be the time when the STA uses the regular EDCA and MU-EDCA parameter setting for the channel access of that AC to access the channel. Those parameters can be set by the elements as shown in FIG. 1 and FIG. 4.

A Prioritized period of an AC is considered to be the time when the STA uses the HP EDCA and MU-EDCA parameter setting to shorten the nominal channel access time of that AC. In at least some cases, the prioritized periods of an AC may be scheduled by the AP or STA, such as periodically or dynamically. In at least some cases, during the prioritized period, the STA only uses the HP EDCA and MU-EDCA parameters for transmitting prioritized packets while using the regular or LP EDCA and MU-EDCA parameters for transmitting other packets.

A non-priority period of an AC is considered to be the time when the STA uses the LP EDCA and MU-EDCA parameter setting to increase the nominal channel access time of that AC. In at least some cases, the non-priority periods of an AC can be scheduled by an AP or STA, such as periodically or dynamically.

It should be noted that the mode of the period (e.g., regular period, prioritized period, non-priority period) for each AC can differ at specific points of time. For example, a STA could have a prioritized period of AC_VO, non-priority period of AC_VI, and regular period of AC_BE and AC_BK at the same time.

4.3.1.1. Flow Diagrams

Figure 9:
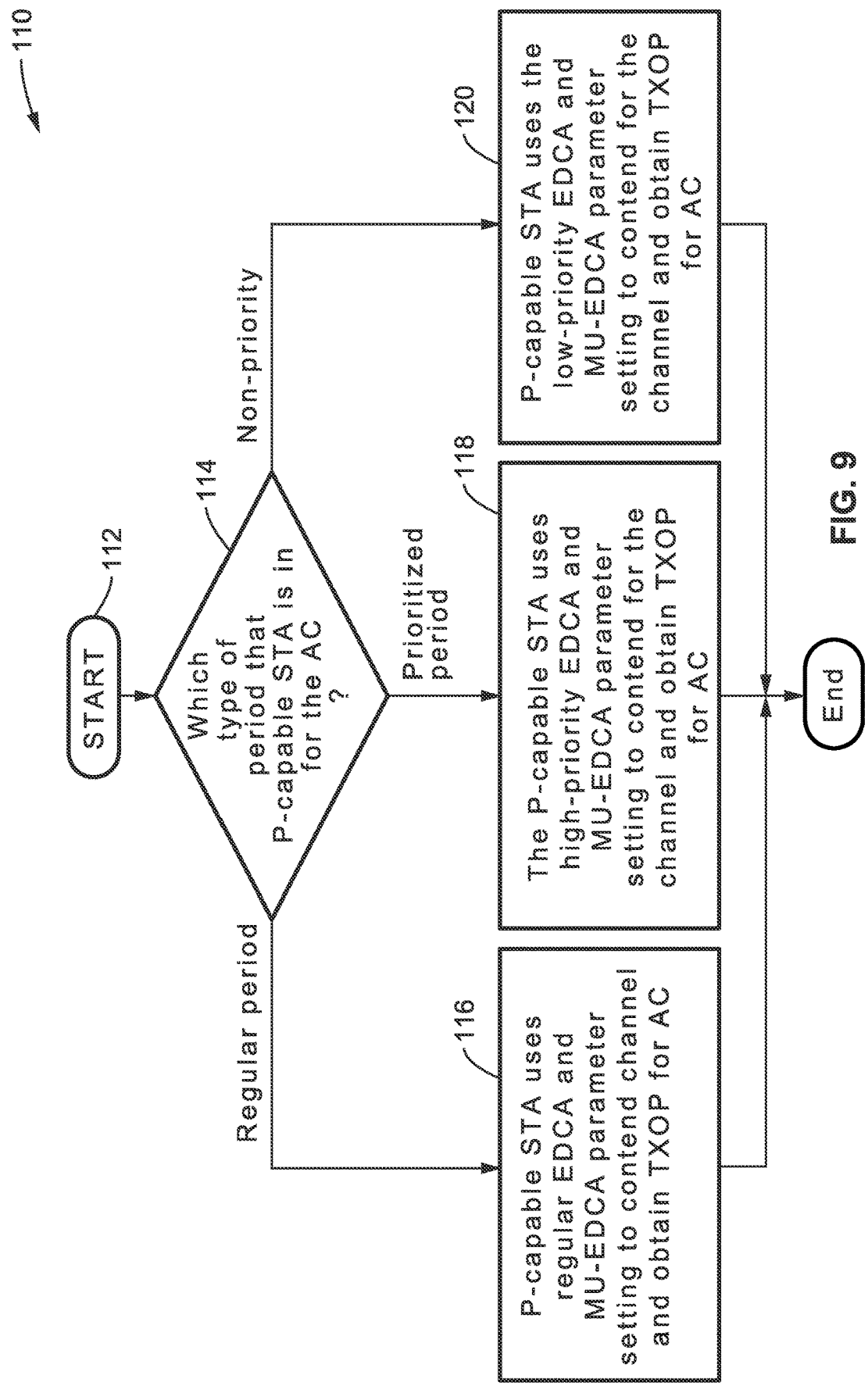
FIG. 9 is a flow diagram of a priority-capable (P-capable) STA contending for the channel and obtaining a Transmit Opportunity (TXOP) of an AC, according to at least one example of the present disclosure.

FIG. 9 illustrates an example embodiment 110 of a P-capable STA contending for the channel toward obtaining a Transmit Opportunity (TXOP) of an AC. Execution starts 112 and a check 114 determines which type of period a P-capable STA is in for an AC. If the STA is in a regular period, then at block 116 the STA uses the regular EDCA and MU-EDCA parameters to contend for the channel and obtain TXOP for that AC. If the STA is in a prioritized period, then at block 118 the STA uses the high-priority EDCA and MU-EDCA parameters to contend for the channel and obtain TXOP for that AC. And if the STA is in a non-priority period, then at block 120 the STA uses the low-priority EDCA and MU-EDCA parameters to contend for the channel and obtain TXOP for that AC. After this execution ends.

It should be appreciated that it is possible for the STA to only use the high-priority EDCA and MU-EDCA parameters to contend for and obtain TXOP for prioritized packet transmissions. For other packets, the STA could use regular or low-priority EDCA and MU-EDCA parameters for channel contention. More details are described in FIG. 10.

Figure 10:
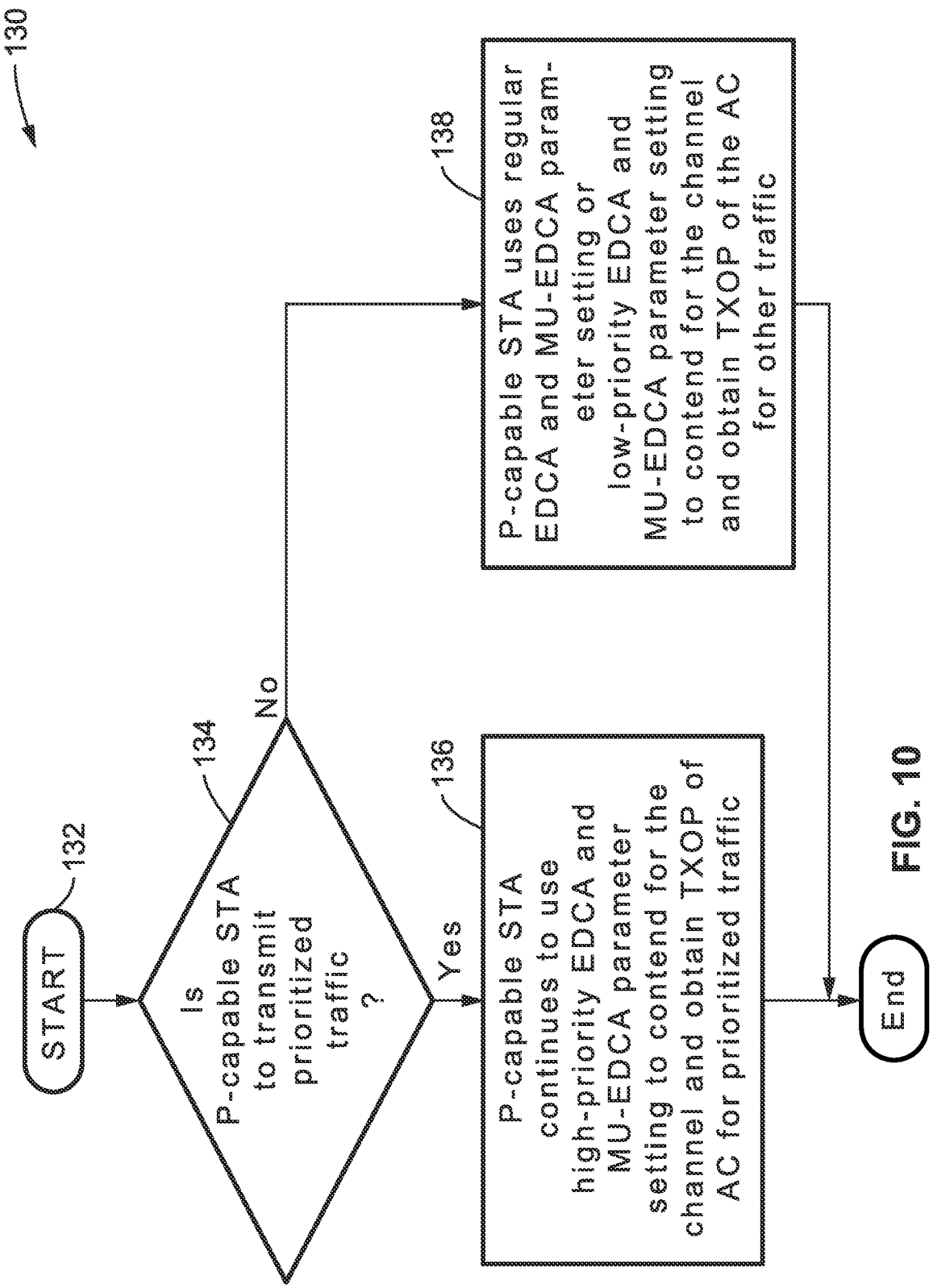
FIG. 10 is a flow diagram of a P-capable STA contending for the channel and obtaining TXOP of an AC during a prioritized period, according to at least one example of the present disclosure.

FIG. 10 illustrates an example embodiment 130 of a P-capable STA contending for the channel and obtaining TXOP of an AC during a prioritized period.

Execution starts 132 and a check 134 is made to determine if the P-capable STA is to transmit prioritized traffic. If it is determined that the STA is intending to transmit prioritized traffic, then at block 136 the STA uses the high-priority EDCA and MU-EDCA parameters to contend for and obtain a TXOP of the AC for the prioritized traffic. If it is determined at block 134 that the P-capable STA does not have prioritized traffic to transmit, then execution reaches block 138 and the STA uses the low-priority or regular EDCA and MU-EDCA parameters to contend for and obtain TXOP of the AC.

Thus it is seen that the P-capable STA only uses high-priority EDCA and MU-EDCA parameters for the prioritized traffic. It will be noted that FIG. 9 and FIG. 10 can be utilized in combination or a STA may follow either FIG. 9 or FIG. 10 to contend for the channel.

Figure 11:
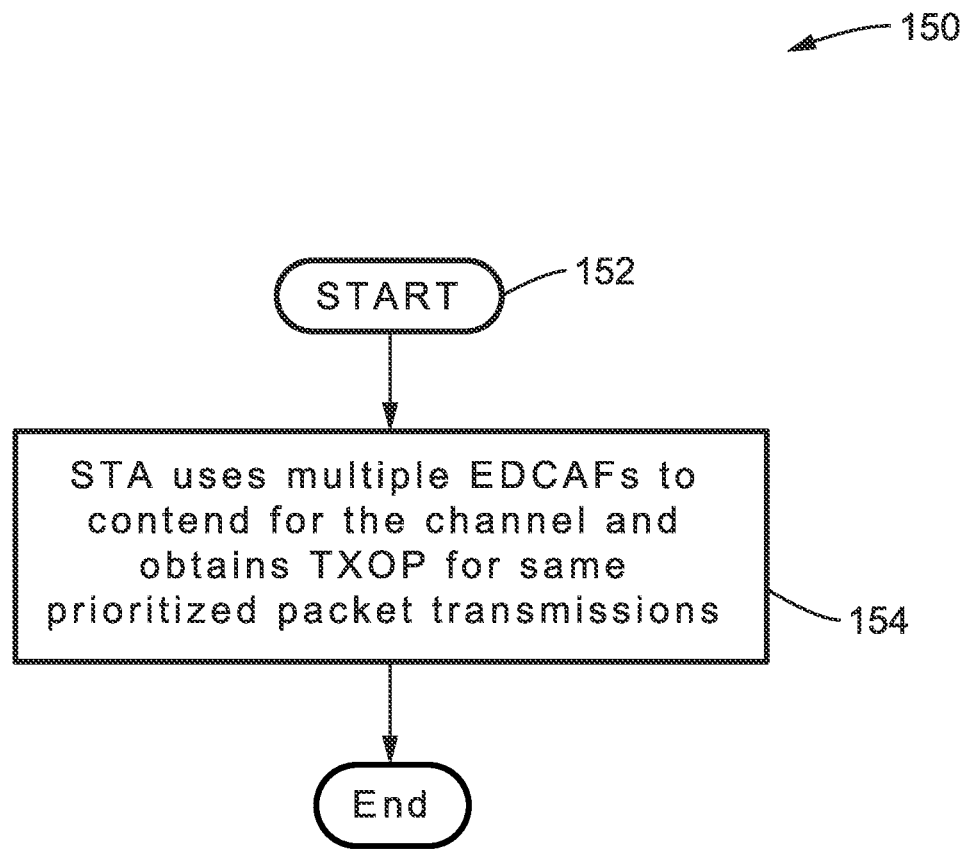
FIG. 11 is a flow diagram of a STA contending for channel access and obtaining a TXOP for prioritized packet transmissions during a prioritized period, according to at least one example of the present disclosure.

FIG. 11 illustrates an example embodiment 150 of a STA contending for channel access and obtaining a TXOP for prioritized packet transmissions during a prioritized period. Execution starts 152 and the STA contends 154 for the channel using multiple EDCAFs, and obtains the TXOP for the same prioritized packet transmissions.

It should be appreciated that throughout the present disclosure the terms AC_x and or AC_y are each utilized to represent any one of the Access Classes (ACs).

For example, the EDCAFs of AC_x and AC_y could contend for the channel at the same time to transmit packets from AC_x. Either AC_x or AC_y obtains the TXOP, and it transmits the packets from AC_x even if there are packets in the transmit queues of AC_y. It should be noted that AC_y may contend for the channel even if it does not have packets from AC_y to transmit. It is possible that AC_y must have lower priority than AC_x.

This method may be used in the present disclosure for prioritized packets in the prioritized period only. This method provides a mechanism to allow the EDCA Function of an AC to be used to contend for the channel and obtain the TXOP for transmitting the packets from another AC.

4.3.1.2. Priority EDCA Parameter Set Update

Figure 12:
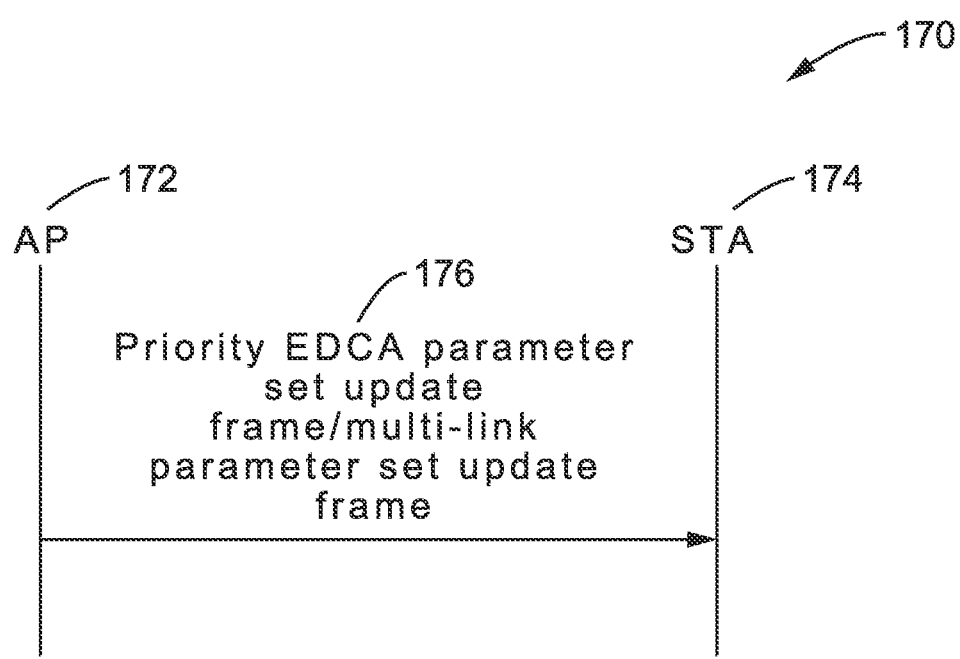
FIG. 12 is a communication diagram of an AP sending a priority EDCA parameter set update frame, or a multi-link parameter set update frame, according to at least one example of the present disclosure.
Figure 21:
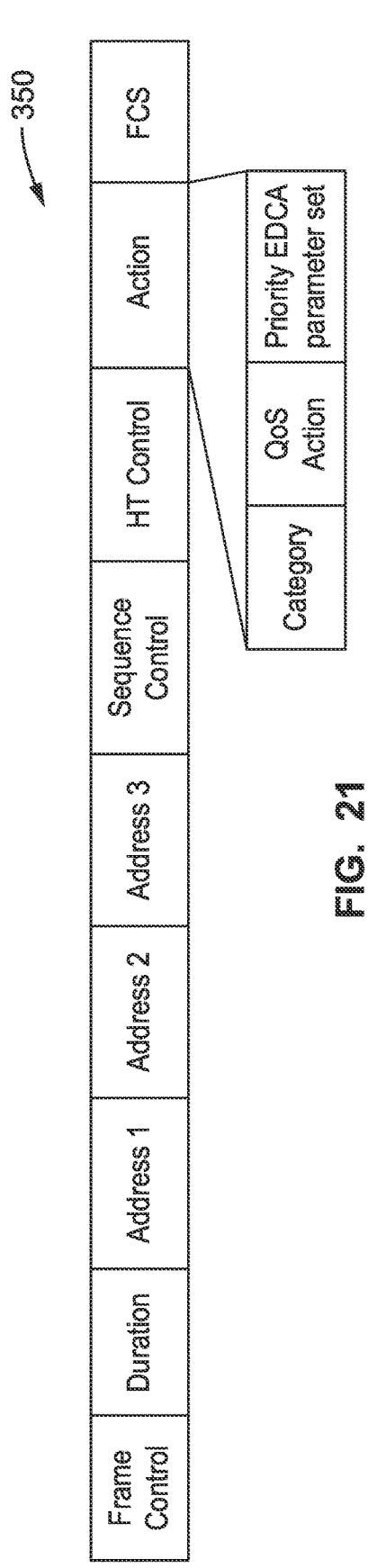
FIG. 21 is a data field diagram of a Priority parameter set update frame, according to at least one example of the present disclosure.
Figure 22:
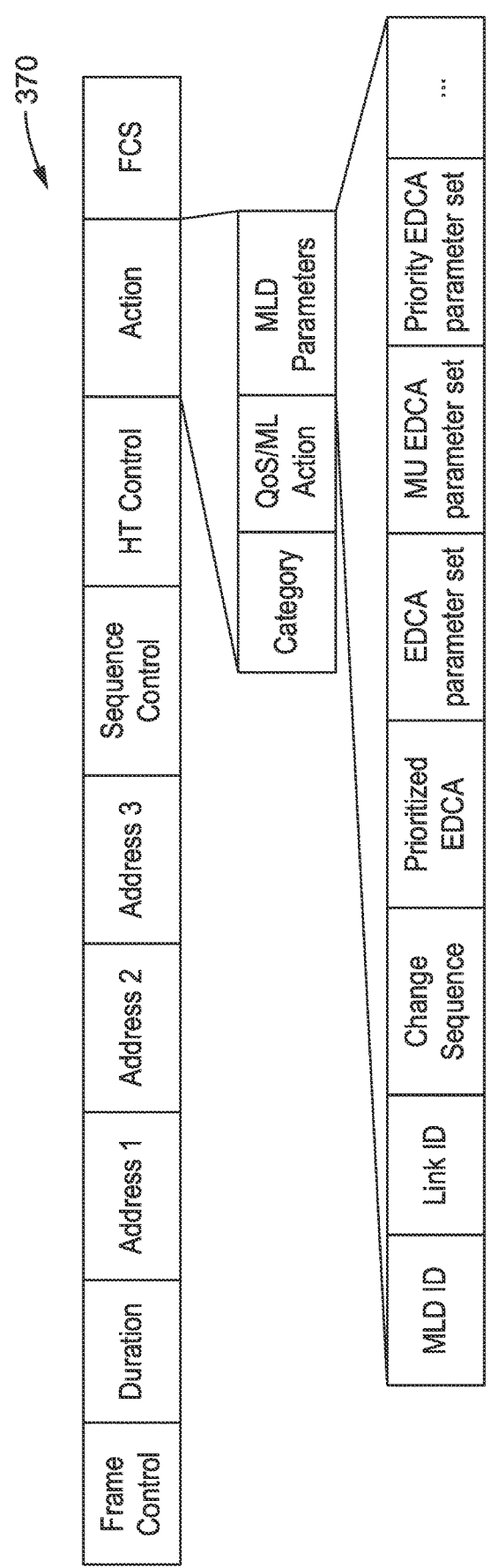
FIG. 22 is a data field diagram of a Multi-Link parameter update frame, according to at least one example of the present disclosure.

FIG. 12 illustrates an example embodiment 170 of an AP 172 sending 176 a priority EDCA parameter set update frame or a multi-link parameter set update frame to update the priority EDCA parameter of the receiver STA 174. If the receiver STA is affiliated with an MLD, the other STAs affiliated with the same MLD can also update their priority EDCA parameters according to the context in the multi-link parameter set update frame. The format of the priority EDCA parameter set update frame and a multi-link parameter set update frame are shown in FIG. 21 and FIG. 22, respectively.

It should be noted that the multi-link parameter set update frame can also be used to update general multi-link parameters, such as the default EDCA parameter and MU EDCA parameter of all the STAs affiliated with a MLD.

Figure 16:
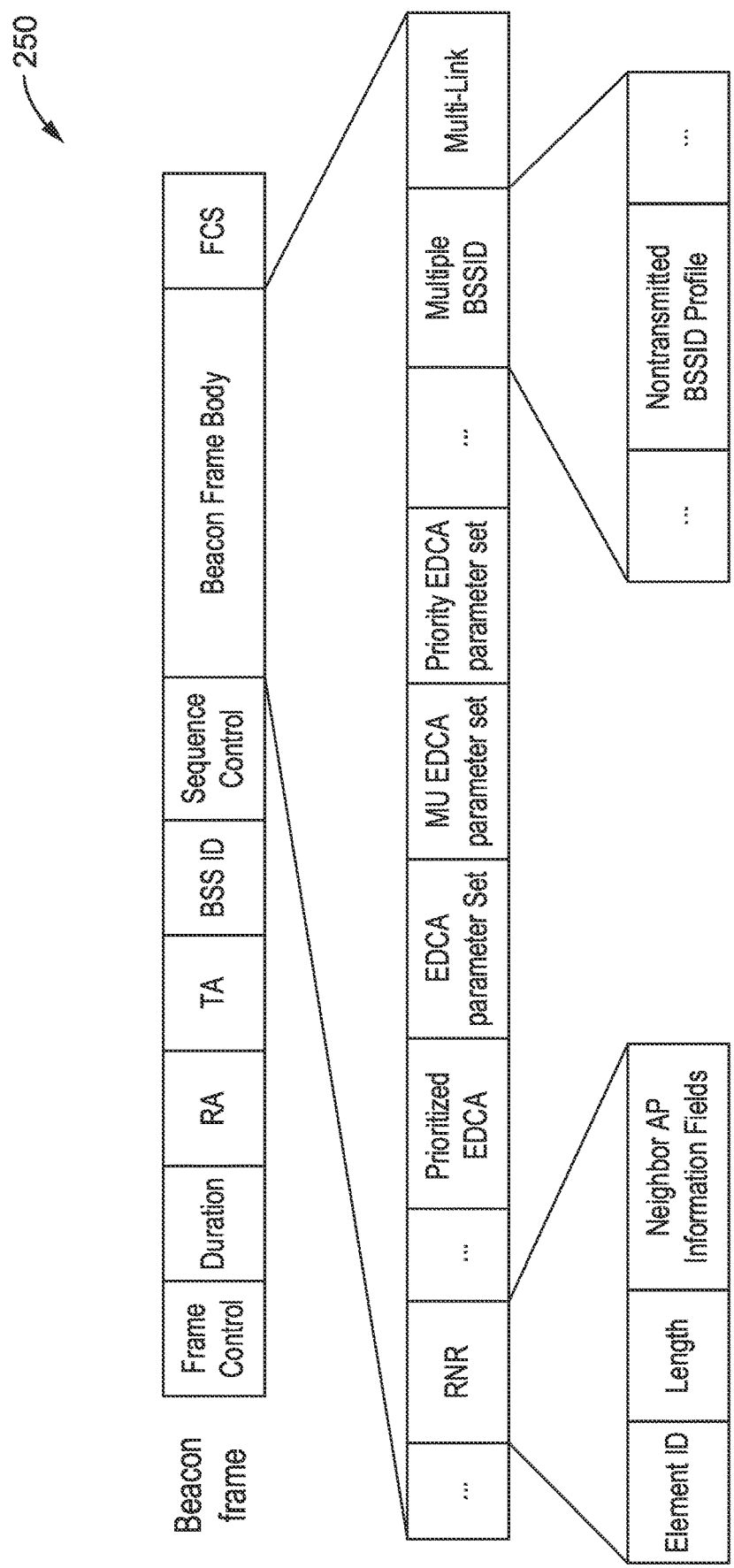
FIG. 16 is a data field diagram of beacon frame content including EDCA parameter set element, MU EDCA parameter set element and priority EDCA parameter set element, according to at least one example of the present disclosure.

It should be noted that it is also possible that an AP sends a beacon frame, (ML) probe response frame, or (re)association response frame as shown in FIG. 16 to update the priority EDCA parameter of the receiver STA.

4.3.1.3. Frame Format

The Priority EDCA parameter set element can be used by an AP to set the high-priority EDCA and MU-EDCA parameters and low-priority EDCA and MU-EDCA parameters for its associated STAs.

The Priority EDCA parameter set element can be carried by the frames which carry the EDCA parameter set element as shown in FIG. 1 and MU EDCA parameter set element as shown in FIG. 4. For example, the Priority EDCA parameter set element can be included in the beacon frame, the probe response Frame, or (re)association response frame to indicate the high-priority and low-priority EDCA and MU-EDCA parameters that should be set at its associated STAs.

Additionally, it is possible that the Priority EDCA parameter set element can be carried in the Per-STA Profile field of the multi-link element, Reduced Neighbor Report (RNR) element, and Multiple BSSID element as defined in IEEE 802.11be to indicate the high-priority and low-priority EDCA and MU-EDCA parameter setting of its collocated APs. The AP can send a priority EDCA parameter set update frame to update the priority EDCA parameters at the STA.

FIG. 13 illustrates the format of a priority EDCA parameter set element. Element ID and Element ID extension fields provide identification of the element to indicate this element is a Priority EDCA parameter set element. A Length field indicates the length of the element. A QoS Info field is defined in IEEE 802.11 as was shown in FIG. 2.

An Updated EDCA Info field is defined in IEEE 802.11 and reserved for a non-S1G STA. An HP Parameter Records field carries the HP parameter record subfields of all the ACs.

The format of a HP parameter record subfield is described below in FIG. 14. An HP Parameter Records field is set by an AP to indicate the high-priority EDCA and MU EDCA parameters that should be set at the corresponding STA. If the STA receives it in a priority EDCA parameter set update frame, multi-link parameter set update frame, beacon frame, (ML) probe response frame, or (re)association response frame, then the STA should update the high-priority EDCA parameters of that AC on its side.

It should be noted that it is possible that an HP Parameter Records field only carries the high-priority parameter record subfields of some ACs. If the Priority EDCA parameter set element is carried by priority EDCA parameter set update frame or multi-link parameter set update frame, then the corresponding STA only updates the high-priority EDCA and MU EDCA parameters of the ACs carried by the element.

If the Priority EDCA parameter set element is carried by a beacon frame, (ML) probe response frame, or (re)association response frame, the corresponding STA sets the high-priority EDCA and MU EDCA parameters of the ACs carried by the element. For those high-priority EDCA and MU EDCA parameters of the ACs not carried by the element, the corresponding STA can set them to the default EDCA and MU-EDCA parameters of those ACs.

An LP Parameter Records field of FIG. 13 carries the LP parameter record subfields of all the ACs. The format of a LP parameter record subfield of an AC is shown in FIG. 15. An LP Parameter Records field is set by the AP to indicate the low-priority EDCA and MU EDCA parameters that should be set at the corresponding STA. If the STA receives it in a priority EDCA parameter set update frame, multi-link parameter set update frame, beacon frame, (ML) probe response frame, or (re)association response frame, then the STA should update the low-priority EDCA and MU EDCA parameters on its side.

It should be noted that it is possible that this field only carries the low-priority parameter record subfields of some ACs. If the Priority EDCA parameter set element is carried by a priority EDCA parameter set update frame or multi-link parameter set update frame, then the corresponding STA only updates the low-priority EDCA and MU EDCA parameters of the ACs carried by the element.

If the Priority EDCA parameter set element is carried by a beacon frame, (ML) probe response frame, or (re)association response frame, the corresponding STA sets the low-priority EDCA and MU EDCA parameters of the ACs carried by the element. For those low-priority EDCA and MU EDCA parameters of the ACs not carried by the element, the corresponding STA can set them to the default EDCA and MU-EDCA parameters of those ACs.

An AC HP Indication field in FIG. 13 indicates which ACs are included in the HP Parameter Records field. This field can contain a list of bits, wherein each bit represents an AC. If the bit is set to a first state (e.g., "1"), then the high-priority EDCA and MU EDCA parameters of the corresponding AC are included in the HP Parameters Records field; otherwise, the high-priority EDCA and MU EDCA parameters of the corresponding AC are not included in the HP Parameters Records field.

The order of the high-priority EDCA and MU EDCA parameters of the corresponding ACs should follow the order of the ACs in this field. For example, if the AC HP Indication has four bits. Starting from left to right, the first bit indicates the presence of the high-priority EDCA and MU EDCA parameters of AC_VO. The second bit indicates the presence of the high-priority EDCA and MU EDCA parameters of AC_VI. The third bit indicates the presence of the high-priority EDCA and MU EDCA parameters of AC_BE. The fourth bit indicates the presence of the high-priority EDCA and MU EDCA parameters of AC_BK. If the field is set to "1010", it indicates the presence of the high-priority EDCA and MU EDCA parameters of AC_VO and AC_BE in the HP Parameter Records.

Starting from left to right, the first HP Parameter Record subfield in the HP Parameter Records is the high-priority EDCA and MU EDCA parameters of AC_VO that the corresponding STA needs to set. The second HP Parameter Record subfield in the HP Parameter Records is the high-priority EDCA and MU EDCA parameters of AC_BE that the corresponding STA needs to set.

An AC LP Indication field in FIG. 13 indicates which ACs are included in the LP Parameter Records field. This field may for example comprise a list of bits with each bit representing an AC. If the bit is set to a first state (e.g., "1"), then the low-priority EDCA and MU EDCA parameters of the corresponding AC are included in the LP Parameters Records field; otherwise the low-priority EDCA and MU EDCA parameters of the corresponding AC are not included in the LP Parameters Records field.

The order of the low-priority EDCA and MU EDCA parameters of the corresponding ACs should follow the order of the ACs in this field. For example, if the AC LP Indication has four bits. Starting from left to right, the first bit indicates the presence of the low-priority EDCA and MU EDCA parameters of AC_VO. The second bit indicates the presence of the low-priority EDCA and MU EDCA parameters of AC_VI. The third bit indicates the presence of the low-priority EDCA and MU EDCA parameters of AC_BE. The fourth bit indicates the presence of the low-priority EDCA and MU EDCA parameters of AC_BK. If the field is set to "1010", it indicates the presence of the low-priority EDCA and MU EDCA parameters of AC_VO and AC_BE in the LP Parameter Records. Starting from left to right, the first LP Parameter Record subfield in the HP Parameter Records is the low-priority EDCA and MU EDCA parameters of AC_VO that the corresponding STA needs to set. The second LP Parameter Record subfield in the LP Parameter Records is the low-priority EDCA and MU EDCA parameters of AC_BE that the corresponding STA needs to set.

FIG. 14 illustrates an example embodiment 210 showing the format of a HP Parameter Record subfield for an AC. AC_x in the figure represents an AC. For example, it could be AC_VI, AC_VO, AC_BE, AC_BK, or other newly added ACs in an EDCA.

An AC_x Parameter Record field indicates the high-priority EDCA parameters that should be set by the corresponding STA. The format of this field could be the same as shown in FIG. 3.

A MU AC_x Parameter Record field indicates the high-priority MU EDCA parameters that should be set by the corresponding STA. The format of this field could be the same as shown in FIG. 5.

An AC_x HP-EDCA Timer field indicates the maximum time that an STA can use the high-priority EDCA and MU EDCA parameters to continuously contend for the channel for AC_x, e.g., the maximum prioritized period time. A non-AP STA shall uniformly count down the LP-EDCA timer of AC_x without suspension to 0 when its value is nonzero.

FIG. 15 illustrates an example embodiment 230 showing the format of LP Parameter Record subfield for an AC. AC_x in the figure represents an AC; which for example, may be AC_VI, AC_VO, AC_BE, AC_BK, or other newly added ACs in the EDCA.

An AC_x Parameter Record field indicates the low-priority EDCA parameters of AC_x that should be set by the corresponding STA. The format of this field is shown in FIG. 3.

A MU AC_x Parameter Record field indicates the low-priority MU EDCA parameters of AC_x that should be set by the corresponding STA. The format of this field is shown in FIG. 5.

An AC_x LP-EDCA Timer field indicates the time that a STA has to use the low-priority EDCA and MU EDCA parameters of AC_x to contend for the channel for AC_x after it has been using the high-priority EDCA and MU EDCA parameters of AC_x, e.g., the non-priority period time after a prioritized period. When the value of the LP-EDCA timer of AC_x has a non-terminal (e.g., non-zero) value it is uniformly counted down to a terminal count (e.g., zero) without suspension by a non-AP STA.

An AC_x Backoff Slot Duration field indicates the backoff slot duration of AC_x that a STA uses during the non-priority period.

FIG. 16 illustrates an example embodiment 250 of beacon frame content including EDCA parameter set element, MU EDCA parameter set element and priority EDCA parameter set element.

A Frame Control field indicates the type of frame. A Duration field contains NAV information used for CSMA/CA channel access. An RA field contains an address for the recipient of the frame. A TA field contains the address of the STA that transmitted the frame. A BSS ID is the label to identify the BSS from others. A Sequence control field contains the fragment number and the sequence number of the packet.

A Beacon Frame Body field can have the same content of the frame body in the beacon frame of IEEE 802.11, with some example subfields listed below. A RNR (Reduced Neighbor Report) element contains channel and other information related to neighbor APs as defined in IEEE 802.11be. Additionally, it is possible that this element can carry the default EDCA, the default MU EDCA and priority EDCA parameter set of the neighbor APs.

An Element ID provides an identification of the element to indicate this element is an RNR element. A Length field indicates the length of the element.

Figure 17:
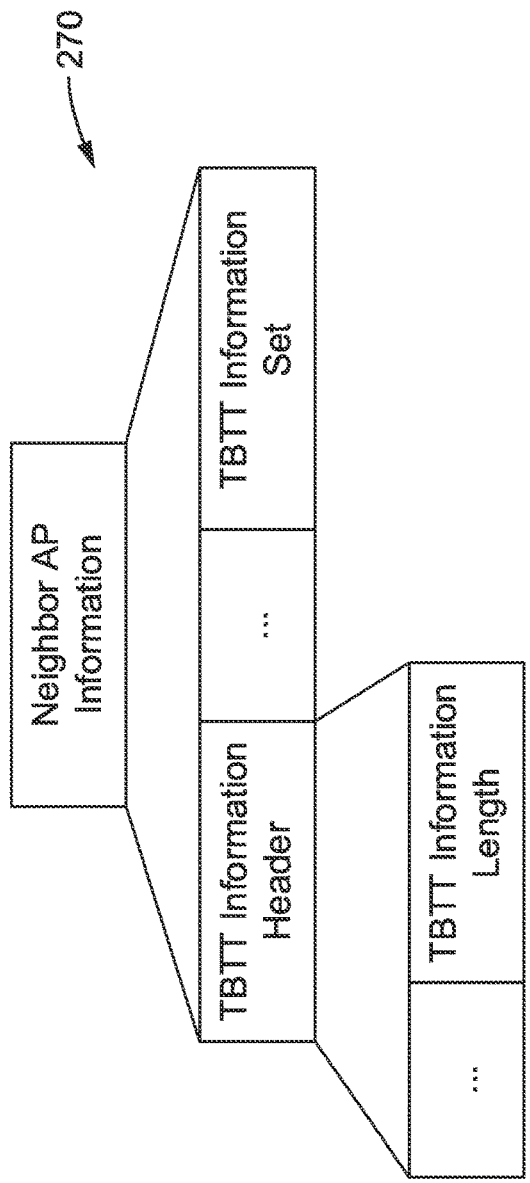
FIG. 17 is a data field diagram of a neighbor AP information field, according to at least one example of the present disclosure.

Neighbor AP Information fields includes one or more neighbor AP Information fields as explained in FIG. 17. Each neighbor AP Information field can carry the default EDCA, the default MU EDCA and priority EDCA parameter sets of a neighbor AP and the other APs affiliated with the same MLD as the neighbor AP on different links.

A Prioritized EDCA field is set to indicate whether the priority EDCA parameter set is used by the AP which sends the beacon frame. By way of example and not limitation, this field can be implemented with one bit indications. If the bit is set to a first state (e.g., "1"), then the priority EDCA parameter set is used; otherwise it is set to a second state (e.g., "0"). In at least one implementation a predetermined process/method can be utilized to determine/calculate the priority EDCA parameters based on the default EDCA and MU EDCA parameters. For example, the TXOP limit of the low-priority EDCA parameter of AC_VI is always set to half of the TXOP limit of the default EDCA parameter of AC_VI. When a STA associates with the AP which the priority EDCA field belongs to, it should use priority EDCA parameters.

An EDCA parameter Set field indicates the default EDCA parameters the receiver STA of the beacon frame should set when it associates with the transmitter AP of the beacon frame. The format of this field is shown in FIG. 1.

A MU EDCA parameter Set field indicates the default MU EDCA parameters the receiver STA of the beacon frame should set when it associates with the transmitter AP of the beacon frame. The format of this field is shown in FIG. 4.

A Priority EDCA parameter Set field indicates the priority EDCA parameters the receiver STA of the beacon frame should set when it associates with the transmitter AP of the beacon frame. The format of this field is shown in FIG. 13.

Figure 20:
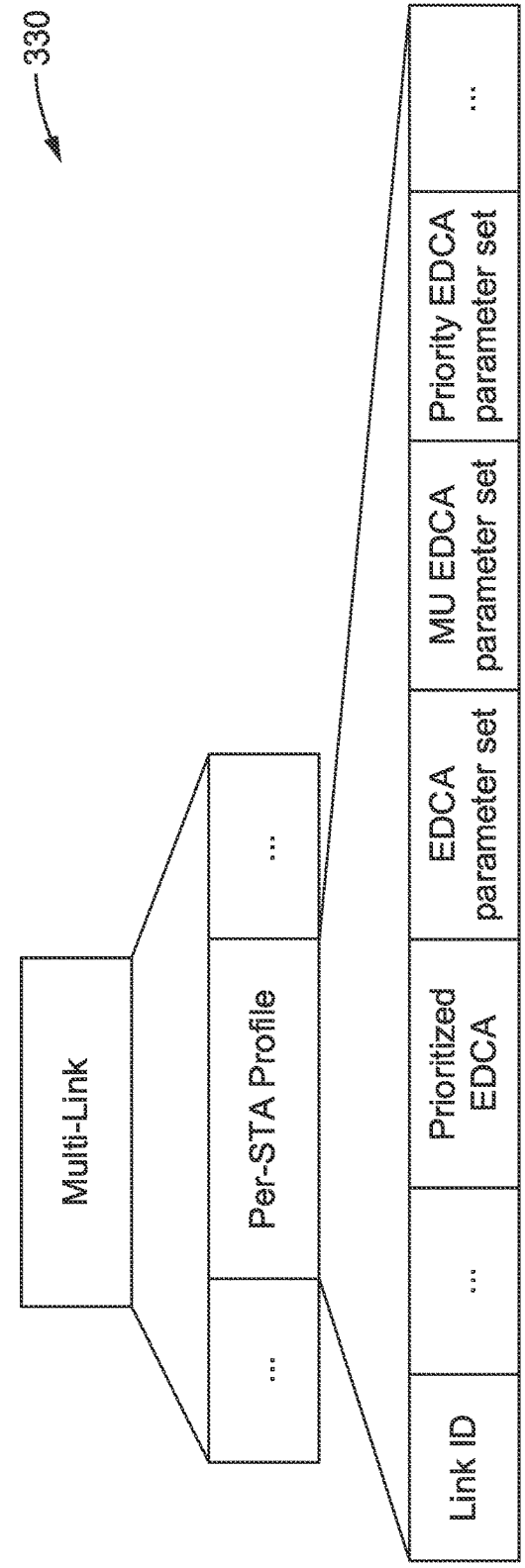
FIG. 20 is a data field diagram of a multi-link element being utilized to carry the Prioritized EDCA element, EDCA parameter Set element, MU EDCA parameter Set element, and Priority EDCA parameter Set field in its Per-STA Profile subfield, according to at least one example of the present disclosure.

A Multiple BSSID element defined in IEEE 802.11be is used to indicate information about all the non-transmitted BSSs that the AP device supports. The information of each non-transmitted BSS is carried by a Non-transmitted BSSID Profile field. It is possible that the non-transmitted BSSID Profile field can include Prioritized EDCA field, EDCA parameter Set element, MU EDCA parameter Set element, and Priority EDCA parameter Set element. If the AP device of a non-transmitted BSS is affiliated with a MLD, a multi-link element can be included in the corresponding non-transmitted BSSID Profile field. The EDCA and MU EDCA parameter setting on each link of the MLD can be carried by the multi-link element as shown in FIG. 20.

A Multi-Link element indicates the information of the APs on the multiple links that belong to the non-transmitted BSSID indicated in the non-transmitted BSSID Profile (as defined in IEEE 802.11be). In FIG. 20 the possibility is illustrated that the Multi-link element carries the Prioritized EDCA field, EDCA parameter Set field, MU EDCA parameter Set field, and Priority EDCA parameter Set field for each APs on multiple links that belong to the non-transmitted BSSID.

It should be noted that if the Priority EDCA parameter set element does not carry the parameters of all of the ACs, then it is possible that the Priority EDCA parameters of those ACs not carried by the Priority EDCA parameter set element can inherit (i.e., set the same values) from those in the EDCA parameter set element and the MU EDCA parameter set element which are carried by the same beacon frame body field as the Priority EDCA parameter set element. For example, if the high-priority EDCA parameters of AC_BK are not included in the Priority EDCA parameter set element as shown in FIG. 16, then those parameters can be set the same as the regular EDCA parameters of AC_BK as indicated in EDCA parameter set element as shown in FIG. 16.

FIG. 17 illustrates an example embodiment 270 of a neighbor AP information field as defined in IEEE 802.11be is here configured to carry the Prioritized EDCA field, EDCA parameter Set field, MU EDCA parameter Set field, and Priority EDCA parameter Set field in its TBTT Information Set subfield in order to set those parameters at the STAs which associate with the AP of the TBTT Information Set subfield.

Figure 18:
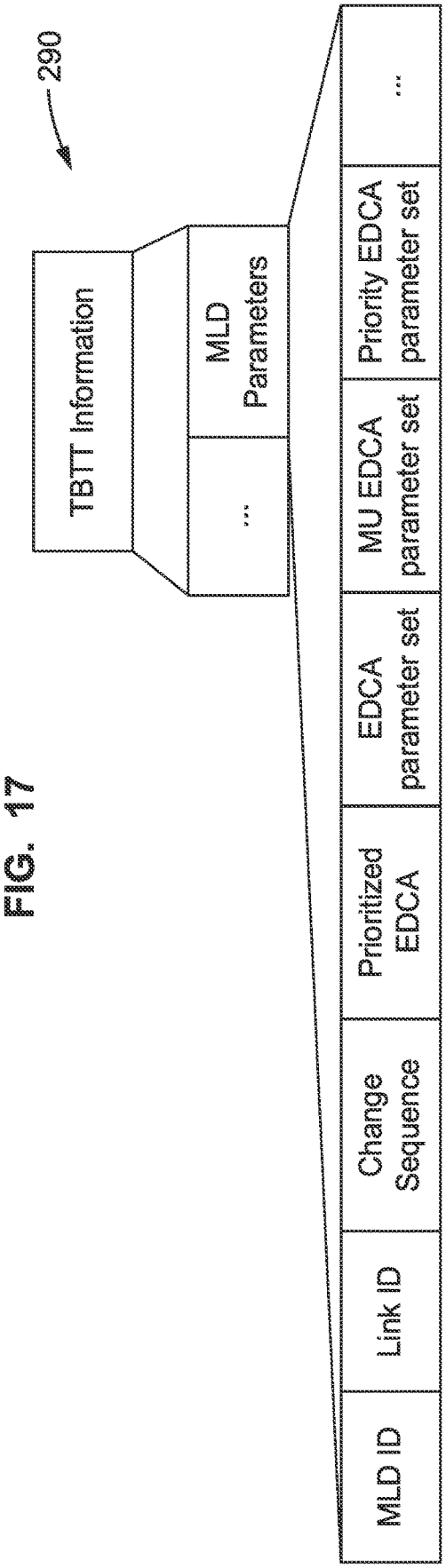
FIG. 18 is a data field diagram of a MLD Parameters subfield of TBTT Information being used for carrying Prioritized EDCA field, EDCA parameter Set element, MU EDCA parameter Set element, and Priority EDCA parameter Set element in a TBTT Information Set subfield, according to at least one example of the present disclosure.

A TBTT Information Length subfield in the TBTT Information Header field is set to indicate the presence of the Prioritized EDCA field, EDCA parameter Set field, MU EDCA parameter Set field, and Priority EDCA parameter Set field in its TBTT Information Set subfield The TBTT Information Set field can then carry the Prioritized EDCA field, EDCA parameter Set field, MU EDCA parameter Set field, and Priority EDCA parameter Set field as shown in FIG. 18.

FIG. 18 illustrates an example embodiment 290 of MLD Parameters subfield of TBTT Information as defined in IEEE 802.11be and is here configured to carry the Prioritized EDCA field, EDCA parameter Set element, MU EDCA parameter Set element, and Priority EDCA parameter Set element in its TBTT Information Set subfield in order to set those parameters at the STAs which associate with the AP of the TBTT Information Set subfield.

A MLD ID indicates the identification of the MLD which the AP is affiliated with. A Link ID provides the identification for the link that the AP is operating on. Those two fields identify the AP which the MLD Parameters belong to.

A Change Sequence indicates the version number of the MLD parameters. Each time the MLD parameters of the AP which the MLD Parameters belongs to are updated, then the numerical value of this change sequence field is updated, such as by being incremented by 1.

A Prioritized EDCA field is set to indicate whether the priority EDCA parameter set is used by the AP which the MLD Parameters belongs to. In at least one implementation this field can be configured to use one bit indications. If the bit is set to a first state (e.g., "1"), then the priority EDCA parameter set is used; otherwise it is set to a second state (e.g., "0"). In at least one implementation, a predetermined process/method is used to determine/calculate the priority EDCA parameters based on the default EDCA and MU EDCA parameters. For example, the TXOP limit of the low-priority EDCA parameter of AC_VI is always set to the half of the TXOP limit of the default EDCA parameter of AC_VI. When a STA associates with the AP which the priority EDCA field belongs to, it should use priority EDCA parameters.

An EDCA parameter Set field indicates the default EDCA parameters. When a STA associates with the AP which the MLD Parameters belong to, it should set the default EDCA parameters as shown in the latest received EDCA parameter Set field. The format of this field is shown in FIG. 1.

A MU EDCA parameter Set field indicates the default MU EDCA parameters. When a STA associates with the AP which the MLD Parameters belong to, it should set the default MU EDCA parameters as shown in the latest received MU EDCA parameter Set field. The format of this field is shown in FIG. 4.

A Priority EDCA parameter Set element indicates the priority EDCA parameters. When a STA associates with the AP which the MLD Parameters belong to, it should set the priority EDCA parameters as shown in the latest received Priority EDCA parameter Set field. The format of this field is shown in FIG. 13.

It should be noted that if the Priority EDCA parameter set element does not carry the parameters of all of the ACs, then it is possible that the Priority EDCA parameters of those ACs not carried by the Priority EDCA parameter set element can inherit (i.e., set the same values) values from those in the EDCA parameter set element and the MU EDCA parameter set element which are carried by the same MLD parameters field as the Priority EDCA parameter set element. For example, if the high-priority EDCA parameters of AC_BK are not included in the Priority EDCA parameter set element as shown in FIG. 18, those parameters can be set the same as the regular EDCA parameters of AC_BK as indicated in EDCA parameter set element as shown in FIG. 18.

If there is no EDCA parameter Set element, MU EDCA parameter Set element, or Priority EDCA parameter Set element, those parameters can inherit from those shown in the beacon frame body or the receiver of the beacon frame as shown in FIG. 16.

Figure 19:
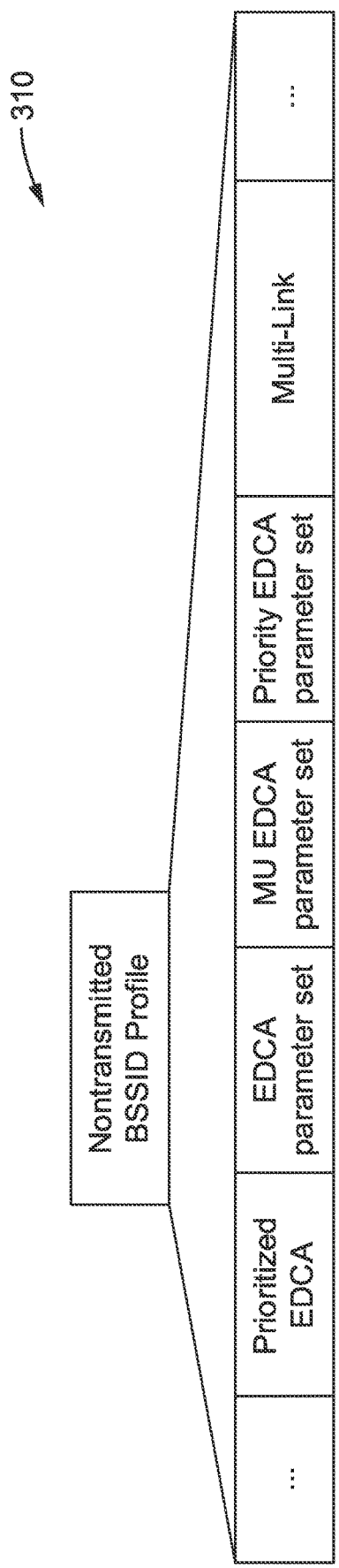
FIG. 19 is a data field diagram of a non-transmitted BSSID profile field being used for carrying Prioritized EDCA field, EDCA parameter Set field, MU EDCA parameter Set field, and Priority EDCA parameter Set fields, according to at least one example of the present disclosure.

FIG. 19 illustrates an example embodiment 310 of a non-transmitted BSSID profile field as defined in IEEE 802.11be and is here configured to carry the Prioritized EDCA field, EDCA parameter Set field, MU EDCA parameter Set field, and Priority EDCA parameter Set field in order to set those parameters in the STAs which associated with the AP of the non-transmitted BSSID profile field.

A Prioritized EDCA field is set to indicate whether the priority EDCA parameter set is used by the AP which the non-transmitted BSSID Profile Field belongs to. This field can be implemented to use one bit indications. For example if a bit is set to a first state (e.g., "1"), then the priority EDCA parameter set is used; otherwise it is set to a second state (e.g., "0"). In at least one implementation a predetermined process/method is utilized to determine/calculate the priority EDCA parameters based on the default EDCA and MU EDCA parameters. For example, the TXOP limit of the low-priority EDCA parameter of AC_VI is always set to half of the TXOP limit of the default EDCA parameter of AC_VI.

An EDCA parameter Set field indicates the default EDCA parameters. When a STA associates with the AP to which the Non-transmitted BSSID Profile Field belongs to, it should set the default EDCA parameters as shown in the EDCA parameter Set field. The format of this field is shown in FIG. 1.

An MU EDCA parameter Set element indicates the default MU EDCA parameters. When a STA associates with the AP to which the Non-transmitted BSSID Profile Field belong to, it should set the default MU EDCA parameters as shown in the MU EDCA parameter Set field. The format of this field is shown in FIG. 4.

A Priority EDCA parameter Set element indicates the priority EDCA parameters. When a STA associates with the AP to which the Non-transmitted BSSID Profile Field belong to, it should set the priority EDCA parameters as shown in the Priority EDCA parameter Set field. The format of this field is shown in FIG. 13. When a STA associates with the AP to which the priority EDCA field belongs to, it should use priority EDCA parameters.

A Multi-Link element indicates the information of the APs on the multiple links that belong to the non-transmitted BSSID indicated in the non-transmitted BSSID Profile (as defined in IEEE 802.11be). FIG. 20 illustrates that in certain cases the Multi-link element can be utilized to carry the Prioritized EDCA field, EDCA parameter Set field, MU EDCA parameter Set field, and Priority EDCA parameter Set field for each APs on multiple links that belong to the non-transmitted BSSID.

It should be noted that if the Priority EDCA parameter set element does not carry the parameters of all of the ACs, then it is possible that the Priority EDCA parameters of those ACs not carried by the Priority EDCA parameter set element can inherit (i.e., set the same values) their values from those in the EDCA parameter set element and the MU EDCA parameter set element which are carried by the same non-transmitted BSSID Profile Field as the Priority EDCA parameter set element. For example, if the high-priority EDCA parameters of AC_BK are not included in the Priority EDCA parameter set element as shown in FIG. 19, those parameters can be set the same as the regular EDCA parameters of AC_BK as indicated in EDCA parameter set element as shown in FIG. 19.

If there is no EDCA parameter Set field, MU EDCA parameter Set field, or Priority EDCA parameter Set field, then those parameters can inherit their value from those fields shown in the beacon frame body or the receiver of the beacon frame as shown in FIG. 16. FIG. 20 illustrates an example embodiment 330 of the multi-link element as defined in IEEE 802.11be and is here configured to carry the Prioritized EDCA element, EDCA parameter Set element, MU EDCA parameter Set element, and Priority EDCA parameter Set field in its Per-STA Profile subfield in order to set those parameters on the STAs which associated with the AP of the Per-STA Profile subfield.

A Link ID field indicates the link upon which the AP operates on. This field identifies the AP which the parameters indicated in the Prioritized EDCA field, EDCA parameter Set element, MU EDCA parameter Set element, and Priority EDCA parameter Set element belongs to.

A Prioritized EDCA field is set to indicate whether the priority EDCA parameter set is used by the AP to which the MLD Parameters belong to. This field can be implemented using one bit indications. For example if a bit is set to a first state (e.g., "1"), then the priority EDCA parameter set is used; otherwise it is set to a second state (e.g., "0"). In at least one implementation, a predetermined process/method is used to determine/calculate the priority EDCA parameters based on the default EDCA and MU EDCA parameters. For example, the TXOP limit of the low-priority EDCA parameter of AC_VI is always set to half of the TXOP limit of the default EDCA parameter of AC_VI. When a STA associates with the AP to which the priority EDCA field belongs to, it should use priority EDCA parameters.

An EDCA parameter Set field indicates the default EDCA parameters. When a STA associates with the AP which the MLD Parameters belong to, it should set the default EDCA parameters as shown in the EDCA parameter Set field. The format of this field is shown in FIG. 1.

A MU EDCA parameter Set field indicates the default MU EDCA parameters. When a STA associates with the AP which the MLD Parameters belong to, it should set the default MU EDCA parameters as shown in the MU EDCA parameter Set field depicted in FIG. 4.

A Priority EDCA parameter Set field indicates the priority EDCA parameters. When a STA associates with the AP which the MLD Parameters belong to, it should set the priority EDCA parameters as shown in the Priority EDCA parameter Set field depicted in FIG. 13.

It will be noted that if the Priority EDCA parameter set element does not carry the parameters of all of the ACs, then it is possible that the Priority EDCA parameters of those ACs not carried by the Priority EDCA parameter set element can inherit (i.e., set the same values) values from those in the EDCA parameter set element and the MU EDCA parameter set element which are carried by the same Per-STA Profile field as the Priority EDCA parameter set element. For example, if the high-priority EDCA parameters of AC_BK are not included in the Priority EDCA parameter set element, those parameters can be set to the same value as the regular EDCA parameters of AC_BK as indicated in EDCA parameter set element.

If there is no EDCA parameter Set field, MU EDCA parameter Set field, or Priority EDCA parameter Set field, those parameters can inherit from those field shown in the Non-transmitted BSSID Profile or the STA which the Non-transmitted BSSID Profile belongs to as shown in FIG. 19.

FIG. 21 illustrates the format of a Priority parameter set update frame. A Frame Control field indicates the type of frame. A Duration field contains NAV information used for CSMA/CA channel access. An Address 1 field contains an address for the recipient of the frame. An Address 2 field contains the address of the STA that transmitted the frame. An Address 3 field contains the BSSID. A Sequence control field indicates the sequence number of the frame. An HT control field indicates the extra control information for HT or VHT or HE or EHT frames. An Action field indicates the action to perform when it is the Priority parameter set update frame. A Category field and QoS Action field indicate the type of action field. In this case it indicates the action field is in the Priority parameter set update frame. A Priority EDCA parameter Set field indicates the priority EDCA parameters that the receiver STA should set to update. The format of this field is shown in FIG. 13.

FIG. 22 illustrates the format of a Multi-Link parameters update frame. A Frame Control field indicates the type of frame. A Duration field contains NAV information used for CSMA/CA channel access. An Address 1 field contains an address for the recipient of the frame. An Address 2 field contains the address of the STA that transmitted the frame. An Address 3 field contains the BSSID. A Sequence control field indicates the sequence number of the frame. An HT control field indicates the extra control information for HT or VHT or HE or EHT frames.

An Action field indicates the action to perform when it is the Multi-Link parameters update frame. A Category field and QoS/ML Action field indicate the type of action field; which in this case indicates the action field is a Multi-Link parameters update frame. A MLD parameters field indicates the parameters to be set on multiple links. An MLD ID indicates the identification of the MLD to which the AP is affiliated with. A Link ID indicates the link that the AP operates on. Those two fields identify the AP which the MLD Parameters belongs to (i.e., the AP that the MLD Parameters carries information of).

A Change Sequence indicates the version number of the MLD parameters. Each time the MLD parameters of the AP which the MLD Parameters belongs to are updated, the number value of this field is updated, such as by being incremented by 1.

A Prioritized EDCA field is set to indicate whether the priority EDCA parameter set is used by the AP to which the MLD Parameters belongs to. This field can be implemented using one bit indications. For example, if a bit is set to a first state (e.g., "1"), then the priority EDCA parameter set is used; otherwise it is set to a second state (e.g., "0"). In at least one implementation a predetermined process/method is used for determining/calculating the priority EDCA parameters based on the default EDCA and MU EDCA parameters. For example, the TXOP limit of the low-priority EDCA parameter of AC_VI is always set to half of the TXOP limit of the default EDCA parameter of AC_VI. When a STA associates with the AP to which the priority EDCA field belongs to, it should use priority EDCA parameters.

An EDCA parameter Set field indicates the default EDCA parameters. When a STA associates with the AP to which the MLD Parameters belong to, it should set the default EDCA parameters as shown in the EDCA parameter Set field depicted in FIG. 1.

A MU EDCA parameter Set element indicates the default MU EDCA parameters. When a STA associates with the AP which the MLD Parameters belong to, it should set the default MU EDCA parameters as shown in the MU EDCA parameter Set field depicted in FIG. 4.

A Priority EDCA parameter Set element indicates the priority EDCA parameters. When a STA associates with the AP to which the MLD Parameters belong to, it should set the priority EDCA parameters as shown in the Priority EDCA parameter Set field as depicted in FIG. 1.

It should be noted that if the Priority EDCA parameter set element does not carry the parameters of all of the ACs, then it is possible that the Priority EDCA parameters of those ACs not carried by the Priority EDCA parameter set element can inherit (i.e., set to the same values) their values from those in the EDCA parameter set element and the MU EDCA parameter set element which are carried by the same MLD parameters field as the Priority EDCA parameter set element. For example, if the high-priority EDCA parameters of AC_BK are not included in the Priority EDCA parameter set element as shown in FIG. 22, those parameters can be set the same as the regular EDCA parameters of AC_BK as indicated in EDCA parameter set element as shown in FIG. 22.

4.3.1.4. Example of Parameter Setting

Table 1A through Table 1C illustrate an example of Regular/High Priority/Low Priority EDCA/MU-EDCA parameter settings. Each AP and STA can set the EDCA and MU EDCA parameters as shown in the table. It should be noted that some parameters may not be shown in this table.

When a STA starts to contend for the channel for an AC, it preferably generates a random backoff count for an additional deferral time before transmitting the packets for that AC, which is as defined in IEEE 802.11. It should be appreciated that the random backoff count must be greater or equal to 1 (backoff slot) when it is generated especially if the AIFSN=1. That is, every time the STA contends for the channel for an AC, it has to count down at least one backoff slot before accessing the channel. For example, the random backoff count could be drawn from a uniform distribution over the interval [1, CW+1] instead of [0, CW], where CW is the contention window size.

Figure 23:
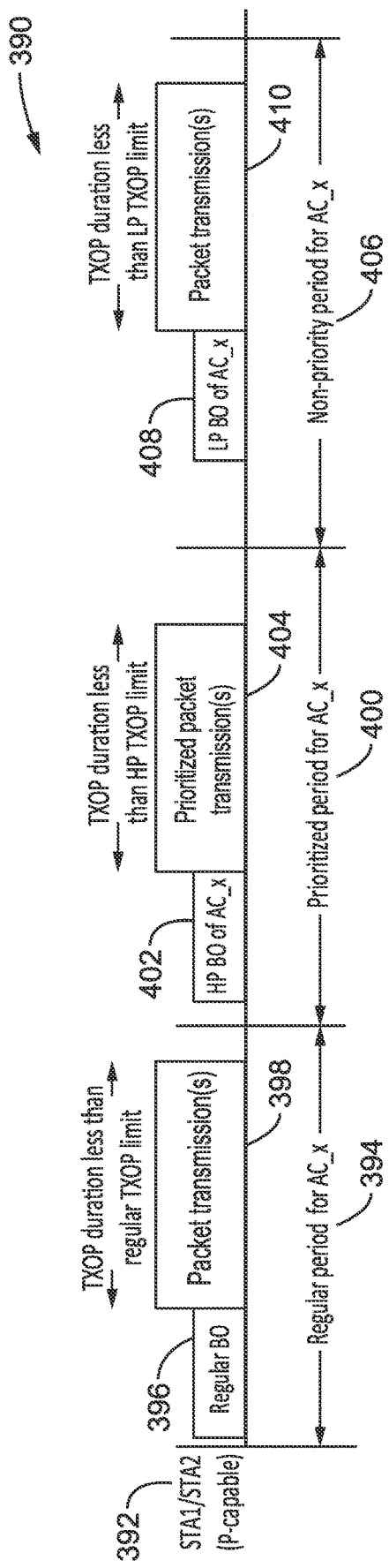
FIG. 23 is a communication sequence diagram of using different EDCA parameter settings, according to at least one embodiment of the present disclosure.

FIG. 23 illustrates an example embodiment 390 of using different EDCA parameter settings. The network topology is that exemplified in FIG. 8. The example AC used is AC_x, which in this and the following examples represents any AC in EDCA.

During the regular period for AC_x, STA1 represents a STA affiliated with a MLD, while STA2 represents a single (non-MLD) STA. The station 392 could represent either STA1 or STA2 which are both P-capable. STA1 and STA2 in this example could also be replaced by an AP.

During the regular period for AC_x 394, the station 392 can use the default EDCA parameters to contend for the channel and obtain the TXOP for packet transmission 398. For example, the backoff 396 (Regular BO as shown in the figure) could be generated by the regular/default contention window of AC_x. The TXOP reservation should follow the restriction of the regular/default TXOP limit of AC_x.

During the prioritized period for AC_x 400, the station 392 can use the high-priority EDCA parameters to contend 402 for the channel and obtain the TXOP for packet transmission 404. For example, the backoff (HP BO as shown in the figure) could be generated by the contention window of the high-priority EDCA parameters of AC_x. The TXOP reservation should follow the restriction of the TXOP limit of the high-priority EDCA parameters of AC_x.

During the non-priority period for AC_x 406, the station 392 can use the low-priority EDCA parameters to contend 408 for the channel and obtain the TXOP for packet transmission 410. For example, the backoff (LH BO as shown in the figure) could be generated by the contention window of the low-priority EDCA parameters of AC_x. The TXOP reservation should follow the restriction of the TXOP limit of the low-priority EDCA parameters of AC_x.

Figure 24:
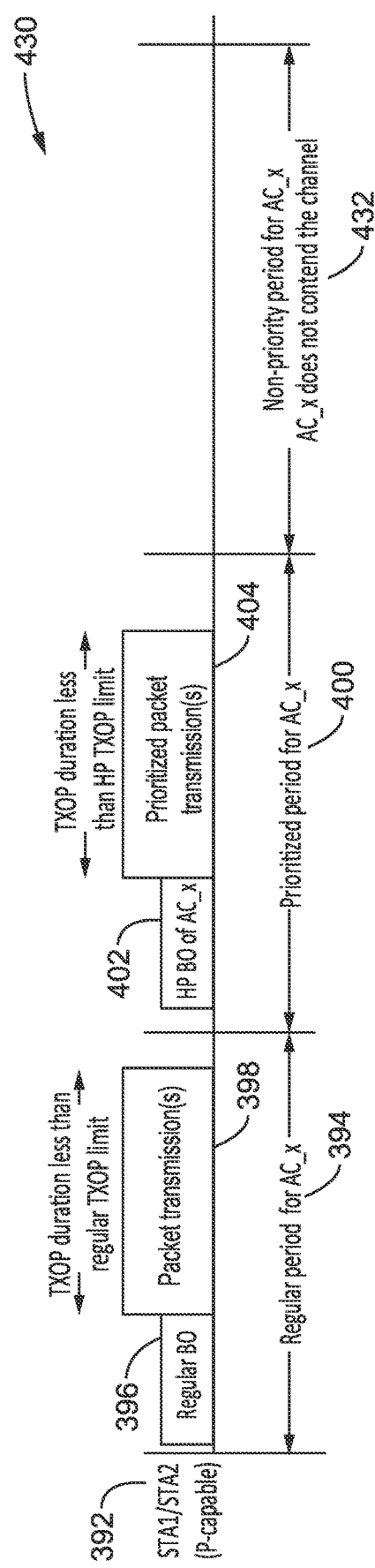
FIG. 24 is a communication sequence diagram of using low-priority EDCA parameter settings to disable the channel contention of an AC, according to at least one embodiment of the present disclosure.

FIG. 24 illustrates an example embodiment 430 of using low-priority EDCA parameter settings to disable the channel contention of an AC. The topology, STAs, and the regular and prioritized periods shown are the same as was described for FIG. 23.

However, during the non-priority period 432 for AC_x, if the station 392 sets CWmin or CWmax of the low-priority EDCA parameters of AC_x to a specific value, such as to a maximum value, it can indicate that AC_x of STA1 or STA2 is not to contend for the channel. Alternatively, in an example embodiment, if the station 392 sets the CWmin and CWmax of the low-priority EDCA parameters of AC_x to the same value, it could also indicate AC_x of STA1 or STA2 does not contend for the channel.

Figure 25:
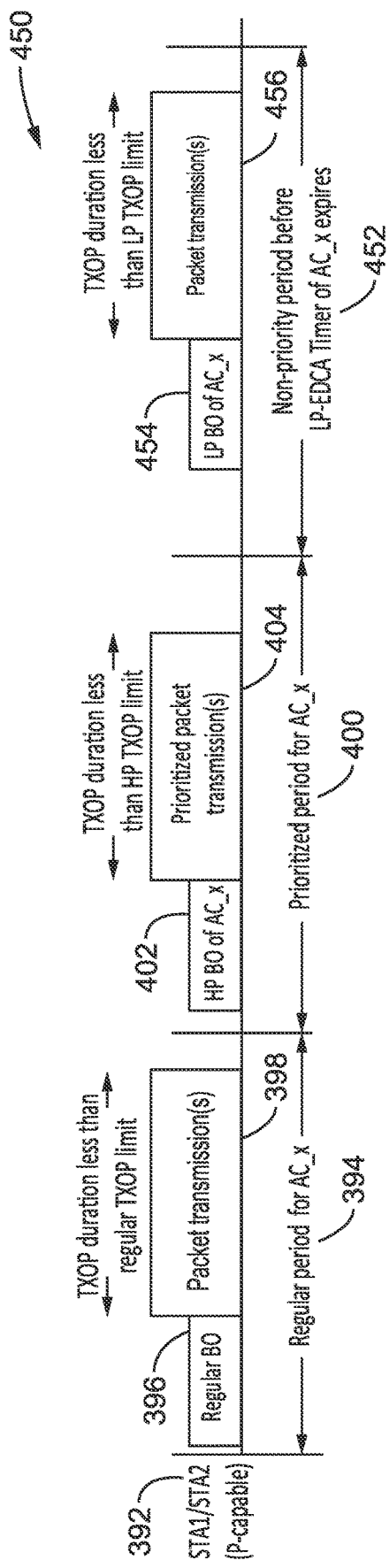
FIG. 25 is a communication sequence diagram of a STA commencing a non-priority period after a prioritized period for an AC, according to at least one embodiment of the present disclosure.

FIG. 25 illustrates an example embodiment 450 of a STA having non-priority period after a prioritized period for an AC. The topology and STA as well as the regular period and prioritized periods are the same as in FIG. 23.

However, toward the right side of the figure is seen a non-priority period 452 before LP-EDCA time of AC_x expires. So at the end of the prioritized period for AC_x, the station 392 should set the LP-EDCA timer of AC_x and start a non-priority period for AC_x immediately. The non-priority period for AC_x is maintained until the LP-EDCA timer of AC_x counts down to a terminal value indicating expiration (e.g., zero). Contention is shown using a low priority backoff 454 and obtaining the channel for transmission 456.

Figure 26:
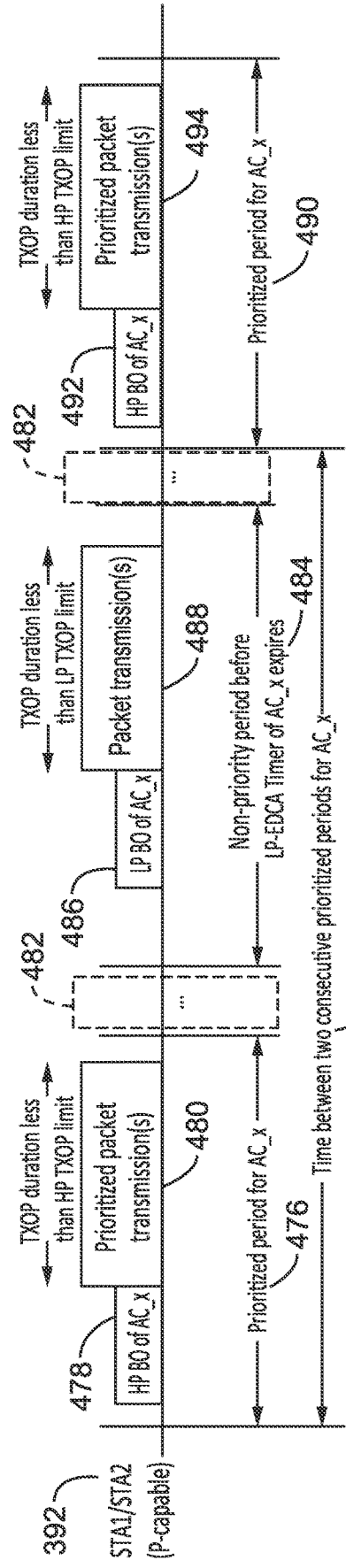
FIG. 26 is a communication sequence diagram of a STA delaying between two prioritized periods for an AC, according to at least one embodiment of the present disclosure.

FIG. 26 illustrates an example embodiment 470 of a STA delaying between two prioritized periods for an AC. The STA and network topology are the same as shown in FIG. 23 through FIG. 25.

A prioritized period 476 for AC_x is shown in which the station 392 can use the high-priority EDCA parameters to contend 478 for the channel and obtain the TXOP and perform prioritized packet transmissions 480. The figure also indicates a minimum time 474 between two consecutive prioritized periods for AC_x. It will be noted that block 482 represents the channel time between the prioritized period and non-priority period. For example, the backoff (HP BO as shown in the figure) could be generated by the high-priority contention window of AC_x. The TXOP reservation should follow the restriction of the high-priority TXOP limit of AC_x.

After the end of the prioritized period for AC_x, STA1 or STA2 may not need to switch to a non-priority period for AC_x immediately. The non-priority period 484 for AC_x can be scheduled at any time before the start of the next prioritized period 490 for AC_x. When the non-priority period for AC_x starts, the station 392 sets and counts down the LP-EDCA Timer of AC_x in contending 486 for the channel. In this example the channel is obtained and a packet transmission 488 performed. The non-priority period ends when the LP-EDCA timer 484 of AC_x counts down to zero.

Then another priority period 490 can be commenced with a High priority backoff 492 and a prioritized packet transmission 494.

Figure 27:
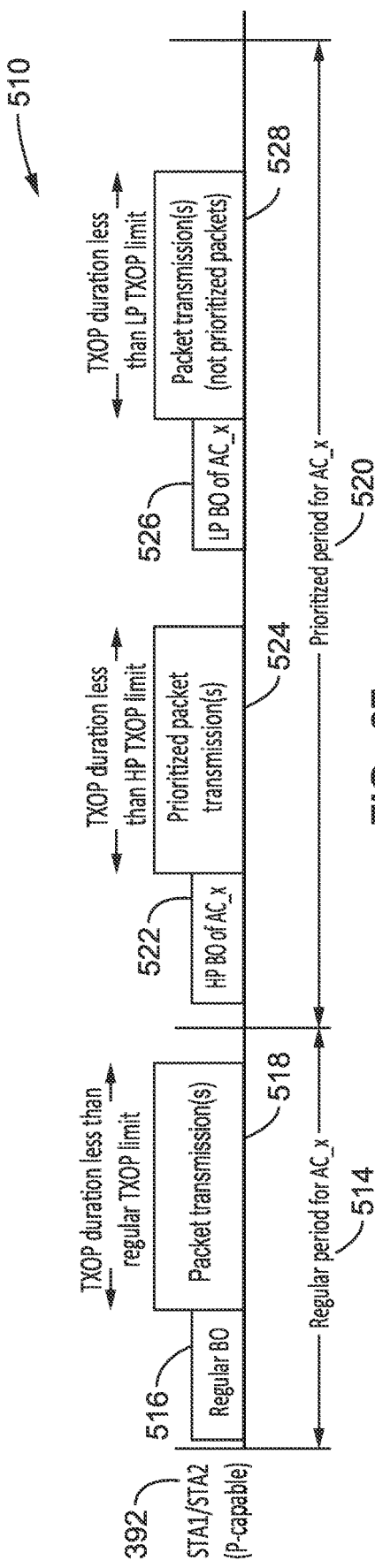
FIG. 27 is a communication sequence diagram of a STA using different EDCA parameters for non-priority packets during a prioritized period, according to at least one embodiment of the present disclosure.

FIG. 27 illustrates an example embodiment 510 of a STA using different EDCA parameters for non-priority packets during a prioritized period. The STAs and network topology are the same shown in FIG. 23 through FIG. 25.

When a STA transmits packets that are not prioritized packets during a prioritized period, it can also use either regular or LP EDCA parameters for channel contention.

During a regular period 514 for AC_x, the station 392 can use the default EDCA parameters to contend 516 for the channel and obtain the TXOP for packet transmission 518. For example, the backoff (Regular BO as shown in the figure) can be generated by the regular/default contention window of AC_x. The TXOP reservation should follow the restriction of the regular/default TXOP limit of AC_x.

Then during a prioritized period 520 for AC_x, the station 392 can use the high-priority EDCA parameters 522 to contend for the channel to obtain the TXOP for transmission 524 of prioritized packets. For example, the backoff (HP BO as shown in the figure) could be generated by the contention window of the high-priority EDCA parameters of AC_x. The TXOP reservation should follow the restriction of the TXOP limit of the high-priority EDCA parameters of AC_x.

During the same prioritized period, the STA has packets to transmit which are not prioritized packets. the station 392 can use the low-priority EDCA parameters to contend 526 for the channel and obtain the TXOP for regular packet transmission 528. For example, the backoff (LH BO as shown in the figure) could be generated by the low-priority contention window of AC_x. The TXOP reservation should follow the restriction of the low-priority TXOP limit of AC_x. It is also possible that the station 392 use the regular EDCA parameters to contend 526 for the channel and obtain the TXOP for regular packet transmission 528.

Figure 28:
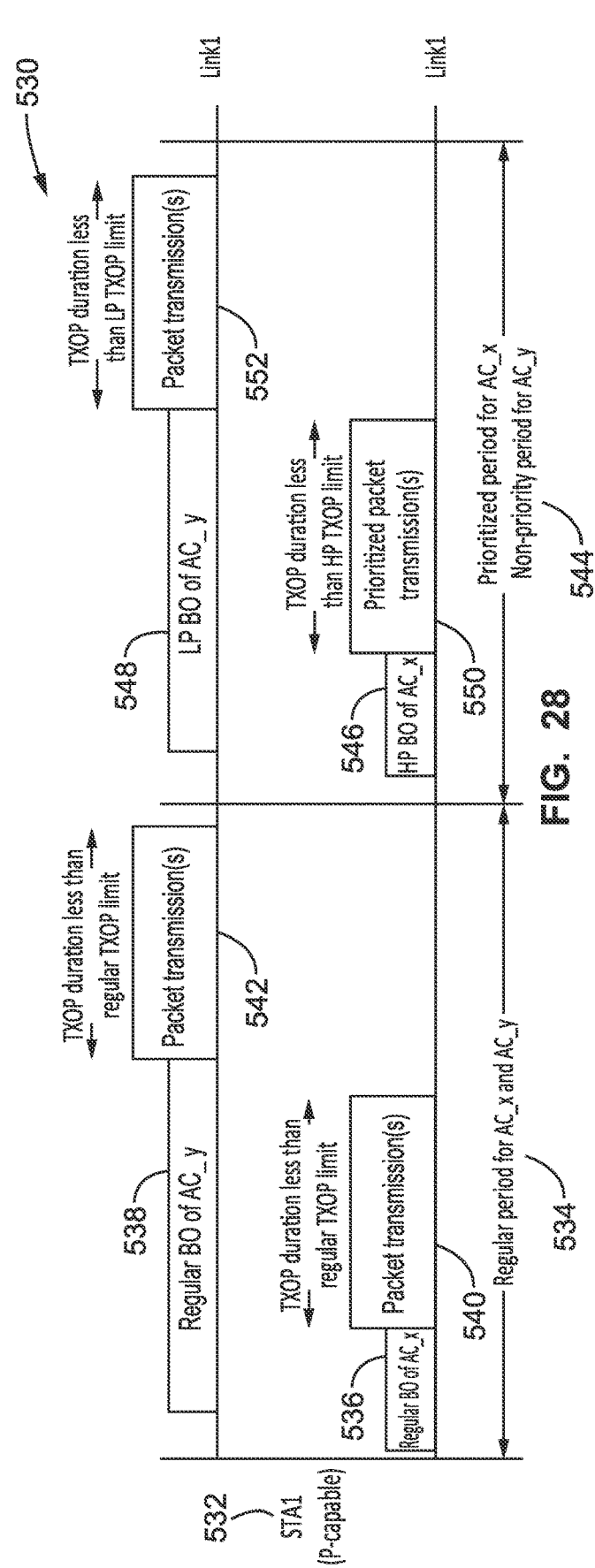
FIG. 28 is a communication sequence diagram of a STA setting different modes of the period for multiple ACs at the same time, according to at least one embodiment of the present disclosure.

FIG. 28 illustrates an example embodiment 530 of a STA setting different modes of the period for multiple ACs at the same time. The network topology is as shown in FIG. 8. The example ACs used are AC_x and AC_y which in these examples represent any AC in EDCA. STA 1 is P-capable and the depicted process remains the same if STA1 is replaced by an AP. It will also be noted that the station 532 could also be STA2 the same as in the previous examples.

STA1 is shown both transmitting and receiving on Link1. STA1 can set the regular duration 534 for both AC_x and AC_y at the same time. During the regular period, STA1 can use the default EDCA parameters to contend for the channel and obtain the TXOP. For example, the regular BO (backoff) of AC_y 538 and AC_x 536 as shown in the figure is generated by the regular/default contention window of AC_y and AC_x, respectively. When AC_x and AC_y reserve the TXOP, their TXOP duration should follow the restriction of the regular/default TXOP limit of AC_x and AC_y, respectively. In the figure AC_x is shown obtaining the channel first and performing packet transmission 540, after which AC_y obtains the channel and performs packet transmission 542.

STA1 can also set a period 544 including a prioritized period for AC_x and a non-priority period for AC_y at the same time. During this time, STA1 uses the high-priority EDCA parameters of AC_x to contend 546 for the TXOP, and low-priority EDCA parameters of AC_y to contend 548 for the TXOP. As shown in the figure, LP BO of AC_y represents the backoff created by the contention window of low-priority EDCA parameters of AC_y. In the example figure, AC_x obtains the channel first and performs prioritized packet transmission 550, after which packet transmission(s) 552 are performed for AC_y.

The TXOP duration of AC_y should not last longer than the TXOP limit in the low-priority EDCA parameters of AC_y. HP BO of AC_x represents the backoff created by the contention window of the high-priority EDCA parameters of AC_x. The TXOP duration of AC_x should not last longer than the TXOP limit in the high-priority EDCA parameters of AC_x.

It should be noted that in such examples, it is possible that STA 532 does not have to schedule a non-priority period for AC_x after the prioritized period for AC_x.

Figure 29:
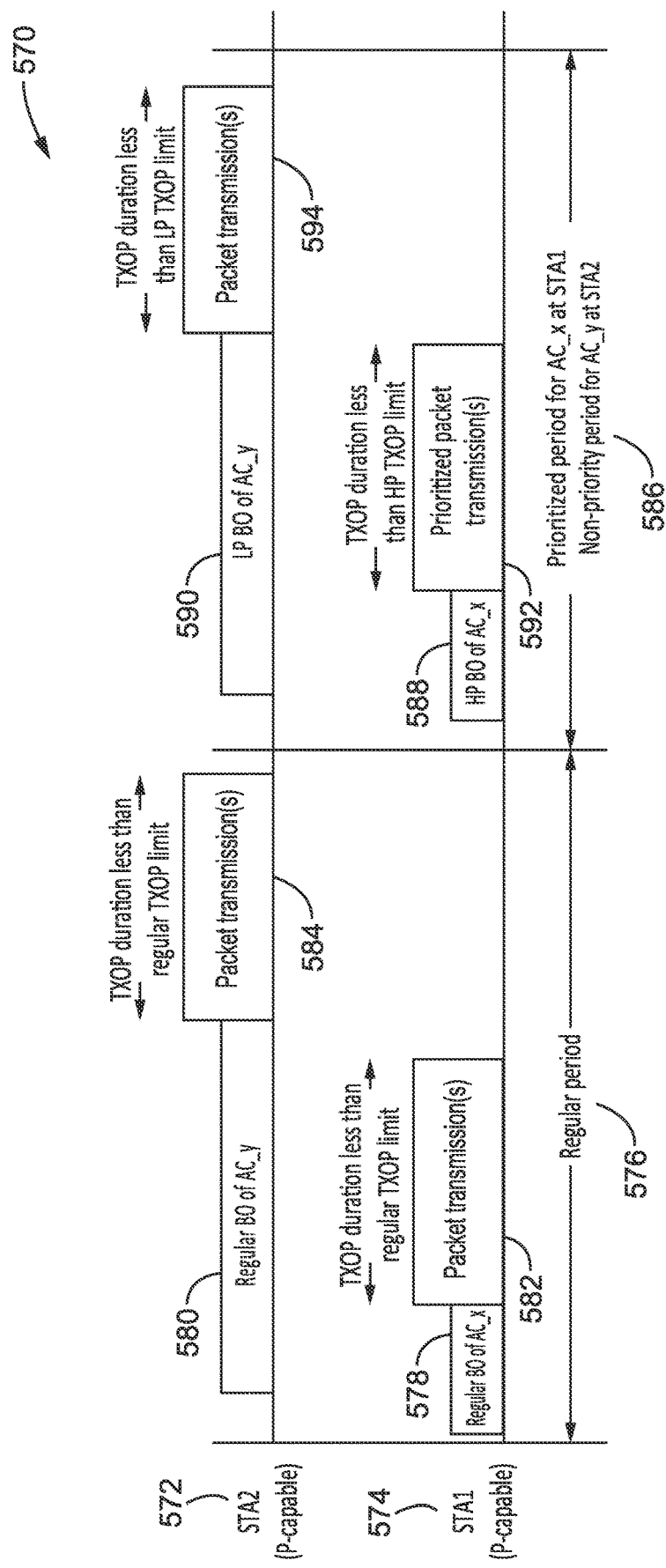
FIG. 29 is a communication sequence diagram of STAs using priority EDCA parameters of multiple ACs during a prioritized period, according to at least one embodiment of the present disclosure.

FIG. 29 illustrates an example embodiment 570 of STAs using priority EDCA parameters of multiple ACs during a prioritized period. The network topology is shown as FIG. 8. It should be noted that AC_x and AC_y are used to represent any ACs in EDCA and it is possible that AC_x and AC_y are the same AC. STA1 572 and STA2 574 are P-capable and can also be replaced by an AP. It is possible that STA1 and STA2 do not associate with the same AP.

During the regular period, STA1 and STA2 can use the default EDCA parameters to contend 578, 580 for the channel and obtain the TXOP. For example, the regular BO (backoff) of AC_y and AC_x as shown in the figure is generated by the regular/default contention window of AC_y and AC_x, respectively. When AC_x and AC_y reserve the TXOP, their TXOP duration should follow the restriction of the regular/default TXOP limit of AC_x and AC_y, respectively. In the figure STA1 for AC_x obtains the channel first and performs packet transmission(s) 582, after which STA2 for AC_y performs packet transmission(s) 584.

Then a period 586 is entered with a prioritized period for AC_x at STA1 and a non-priority period for AC_y at STA2. During this time, STA1 performs a backoff 588 using the high-priority EDCA parameters of AC_x and STA2 uses the low-priority EDCA parameters of AC_y to contend for the channel with backoff 590. As shown in the figure, LP BO of AC_y represents the backoff created by the contention window of low-priority EDCA parameters of AC_y at STA2. The TXOP duration of AC_y should not be longer than the TXOP limit in the low-priority EDCA parameters of AC_y. HP BO of AC_x represents the backoff created by the contention window of high-priority EDCA parameters of AC_x at STA1. The TXOP duration of AC_x should not be longer than the TXOP limit in the high-priority EDCA parameters of AC_x. The figure depicts STA1 obtaining the channel for AC_x first and performing prioritized packet transmission(s) 592, after which STA2 obtains the channel for AC_y and packet transmissions 594.

Figure 30:
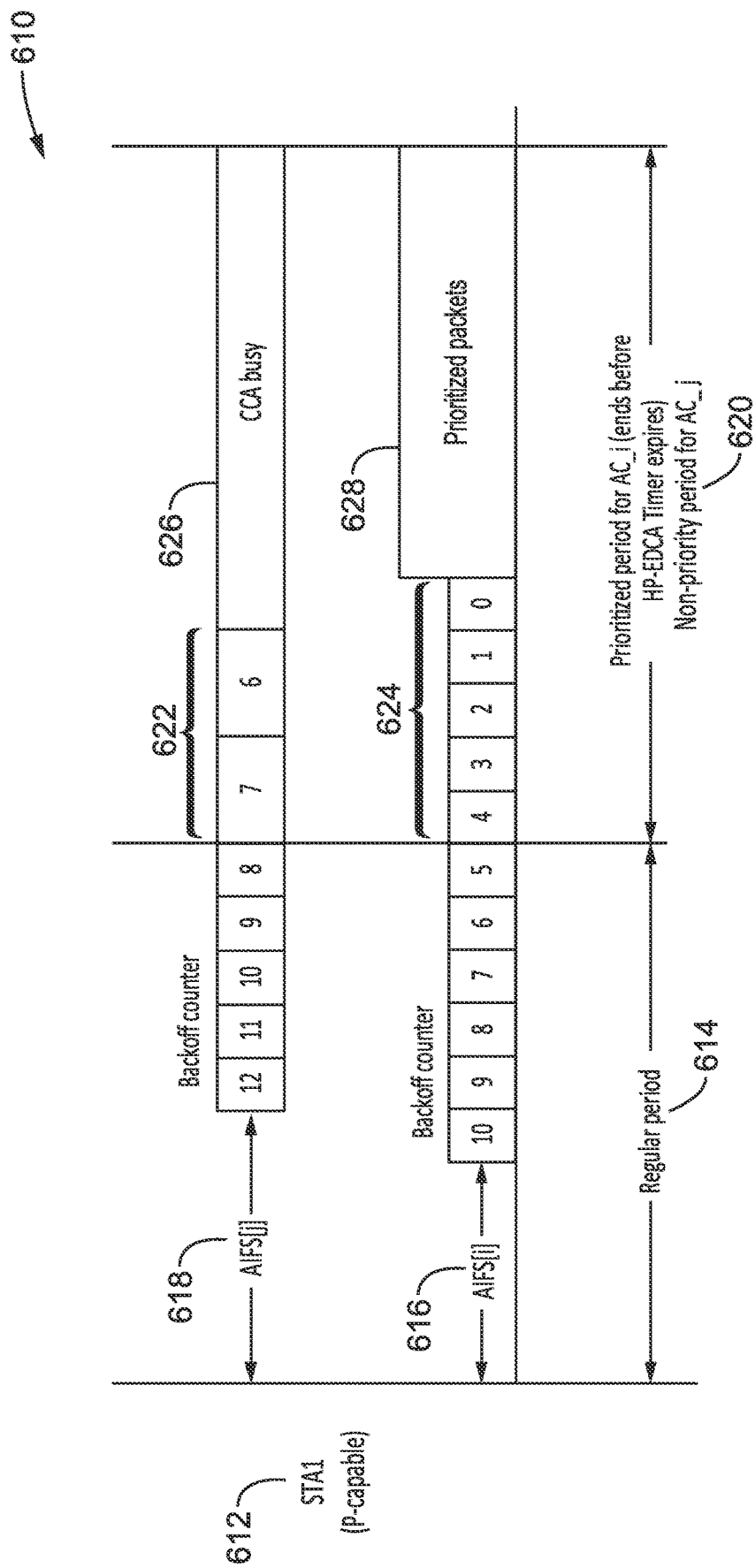
FIG. 30 is a communication sequence diagram of one AC of a STA using the backoff slot duration of LP EDCA parameters for one AC during a prioritized period, according to at least one embodiment of the present disclosure.

FIG. 30 illustrates an example embodiment 610 of one AC of a STA using the backoff slot duration of LP EDCA parameters during a prioritized period. The network topology is the same as shown as FIG. 8. The notations AC_i and AC_j represent any AC in EDCA. During the regular period for AC_i and AC_j STA1 612 is P-capable. STA1 could also be replaced by any type of STA without changing the example.

During the regular period 614, Arbitration Inter-Frame Spacing (AIFS) is depicted as AIFS[i] 616 and AIFS[j] 618. STA1 is seen using the default backoff slot duration when contending for the channel for any AC. The duration of AIFS of an AC can be calculated by the AIFSN number and backoff slot duration of that AC at that period.

A period 620 is seen being entered which comprises a prioritized period for AC_i, which ends before the HP-EDCA timer expires), and is a non-priority period for AC_j. During the non-priority period for AC_j STA1 utilized the backoff slot duration as found in the low-priority EDCA parameters to contend for the channel toward obtaining the TXOP for AC_j. For example, the duration of each of the backoff slots 7 and 6 (622) is double that of the duration for regular backoff slots as seen in slots 8 through 12 of AC_j, and as used by AC_i 624. In view of this difference AC_i receives higher probability to gain the channel more readily than AC_j. STA1 obtains the channel and sends its prioritized packets 628, while AC_j finds a Clear Channel Assessment (CCA) of Busy 626.

Figure 31:
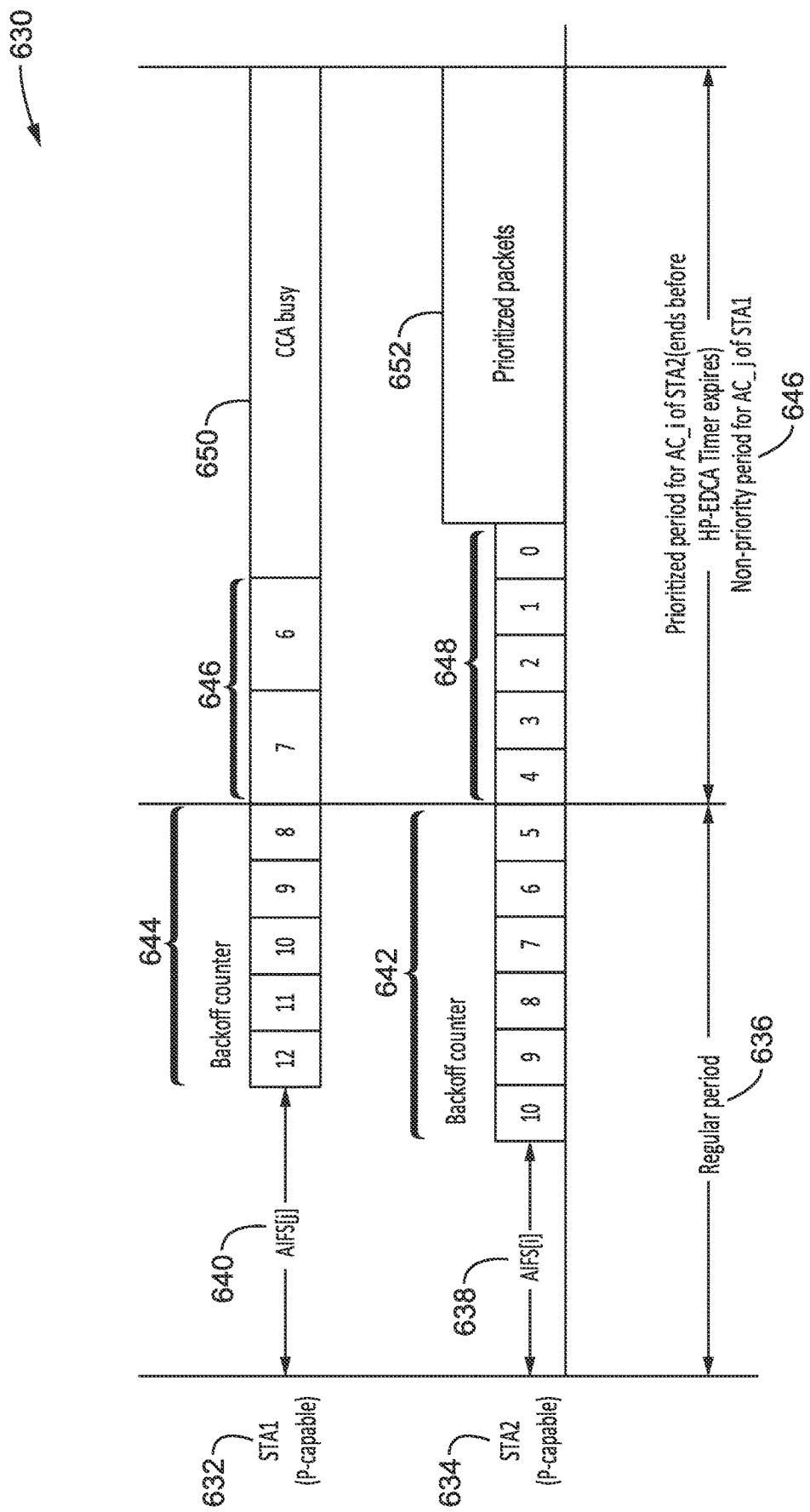
FIG. 31 is a communication sequence diagram of one STA using the backoff slot duration of LP EDCA parameters during a prioritized period, according to at least one embodiment of the present disclosure.

FIG. 31 illustrates an example embodiment 630 of one of the STAs using the backoff slot duration of LP EDCA parameters during a prioritized period. The network topology is shown as FIG. 8, depicting here STA1 632 and STA2 634 which are P-capable. STA1 could also be replaced by any type of STA. It will be noted again that AC_i and AC_j can represent any AC in EDCA. It is possible that AC_i and AC_j are the same AC.

During the regular period 636 for AC_i and AC_j, STA1 or STA2 can use the default backoff slot duration to contend 642 and 644 for the channel and obtain the TXOP. Preceding the backoffs are seen AIFS[i] 638 and AIFS[j] 640.

Then a new period 646 is entered which is a prioritized period for AC_i of STA2 (which ends before the HP-EDCA timer expires), but is a non-priority period for AC_j of STA1. During the non-priority period for AC_j, STA1 should use the backoff slot duration in the low-priority EDCA parameters to contend 647 for the channel and obtain the TXOP for AC_j. For example, the duration of each of backoff slots 7 and 6 (647) are each double the duration of regular backoff slots 8 through 12 of AC_j. Accordingly, AC_i has a higher probability to gain channel access faster than AC_j. During the prioritized period for AC_i of STA2, the backoff slot duration may be set to the same as that in the regular period. In the figure STA2, after backoff 648 gains channel access for AC_i, and transmits prioritized packets 652, while STA1 after backoff finds CCA Busy 650.

Figure 32:
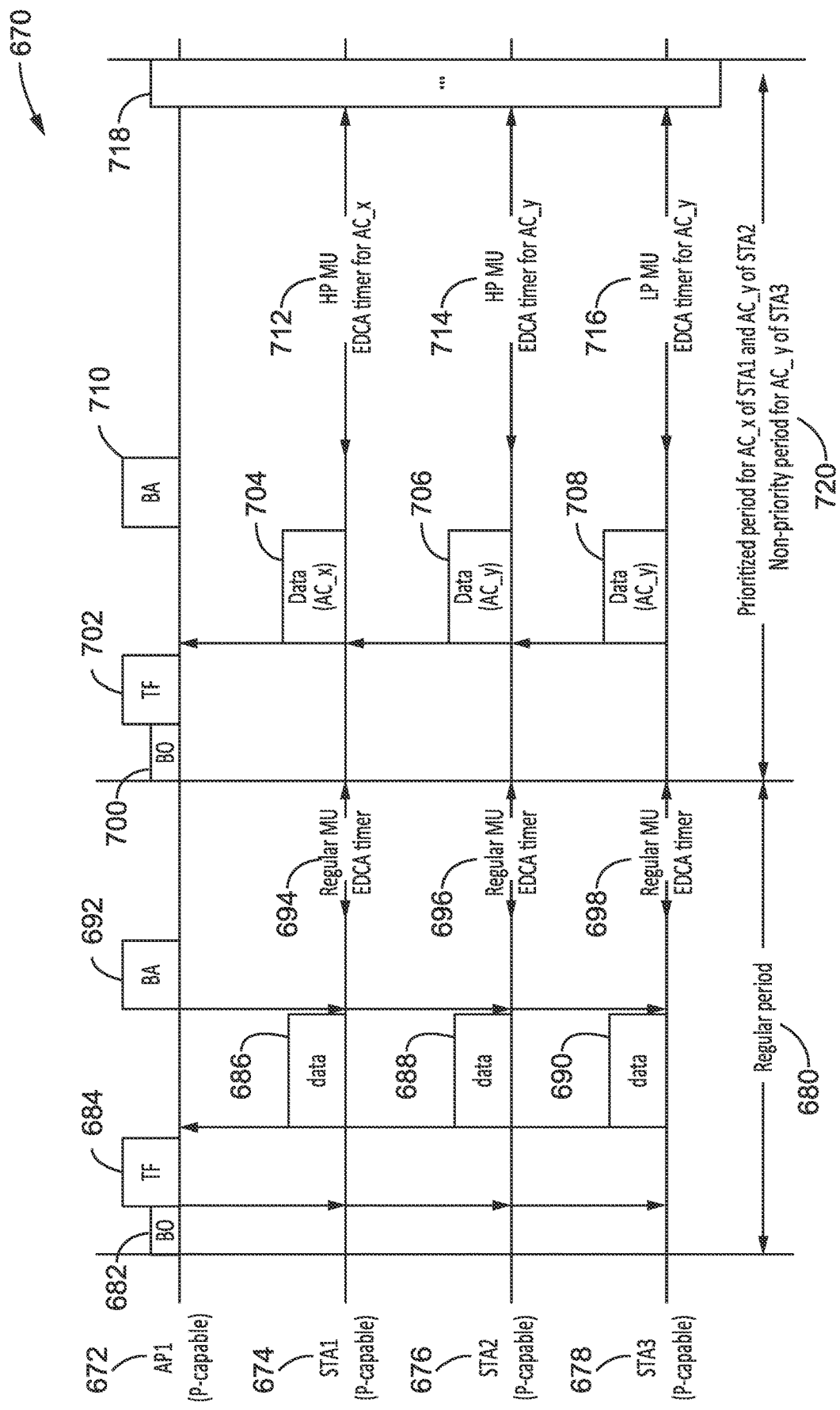
FIG. 32 is a communication sequence diagram of a STA using the MU EDCA parameters of the priority EDCA parameters during a prioritized period, according to at least one embodiment of the present disclosure.

FIG. 32 illustrates an example embodiment 670 of a STA using the MU EDCA parameters of the priority EDCA parameters during a prioritized period. The network topology is shown as FIG. 8 showing AP1 672, STA1 674, STA2 676 and STA3 678, all of which are P-capable. Again the notations AC_x and AC_y can represent any AC in EDCA.

A regular period 680 is shown in which AP1 performs a backoff 682 and gains the channel for Trigger Frame (TF) 684. In response to the TF each of the stations (STA1, STA2 and STA3) perform an uplink transmission sending their respective data 686, 688 and 690 to AP1, for which AP1 responds with a Block Acknowledgement (BA) 692.

STA1, STA2 and STA3 then can use their default MU EDCA parameters to contend for the channel after the trigger-based uplink transmission under IEEE 802.11 has been completed.

A period 720 is entered in which is a prioritized period for AC_x of STA1 and AC_y of STA2, but which is a non-priority period for AC_y of STA3. AP1 performs a backoff (BO) 700, obtains the channel and sends a trigger frame 702.

During the prioritized period for AC_x at STA1 a data frame 704 is sent in response to TF 702, after which the AP sends a BA 710. Then STA1 starts to count down MU EDCA timer for AC_x using the MU EDCA parameters of AC_x in the high-priority (HP) MU EDCA parameters 712. The EDCA timer for AC_x is also set by the high-priority MU EDCA parameters of AC_x.

During the prioritized period for AC_y at STA2 a data frame 706 is sent in response to TF 702, after which the AP sends a BA 710. After this STA2 starts to counts down MU EDCA timer for AC_y using the MU EDCA parameters of AC_y in the high-priority (HP) MU EDCA parameters 714. The MU EDCA timer for AC_y is also set by the high-priority EDCA parameters of AC_y.

During the non-priority period for AC_y at STA3 a data frame 708 is sent in response to TF 702, after which the AP sends a BA 710. Then STA3 starts to counts down MU EDCA timer for AC_y using the MU EDCA parameters of AC_y in the low-priority (LP) MU EDCA parameters 716. The MU EDCA timer for AC_y is also set by the low-priority EDCA parameters of AC_y. The remaining time of the period is represented by 718.

Figure 33:
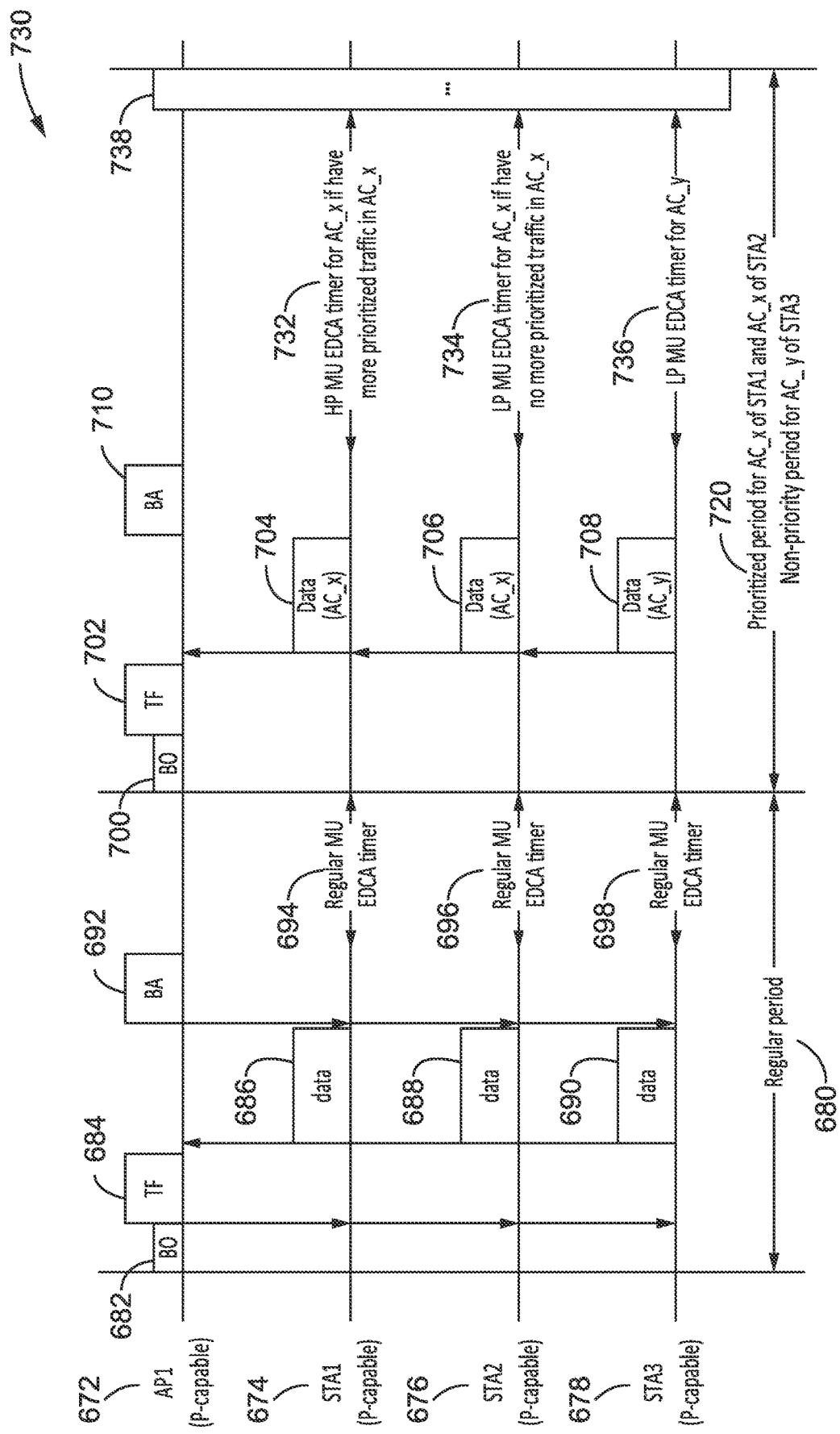
FIG. 33 is a communication sequence diagram of a STA switching to use the MU EDCA parameters of the low-priority (LP) MU EDCA parameters during a prioritized period, according to at least one embodiment of the present disclosure.

FIG. 33 illustrates an example embodiment 730 of a STA switching to use the MU EDCA parameters of the low-priority MU EDCA parameters during a prioritized period. The network topology, notations, and stations are the same as were described for FIG. 32.

The figure depicts the same regular period actions on through to data uplinks 704, 706 and 708 from STA1, STA2 and STA3 respectively.

In this figure however after STA1 for AC_x sends a data frame 704 it starts to counts down MU EDCA timer for AC_x. If STA1 has more prioritized traffic to transmit, it is seen using the MU EDCA parameters of AC_x in the high-priority (HP) MU EDCA parameters 732 during the time it counts down MU EDCA timer for AC_x. The MU EDCA timer for AC_x is also set by the high-priority MU EDCA parameters of AC_x.

During the prioritized period for AC_x at STA2, after sending a data frame 706, then STA2 starts to counts down MU EDCA timer for AC_x. If STA2 does not have any more prioritized traffic to transmit, it can use the MU EDCA parameters of AC_x in the low-priority (LP) MU EDCA parameters 734 during the time it counts down MU EDCA timer for AC_x. The MU EDCA timer for AC_x is also set by the low-priority MU EDCA parameters of AC_x. It should be noted that it is also possible that STA2 uses regular MU EDCA parameters instead of the low-priority MU EDCA parameters.

During the non-priority period for AC_y at STA3, after sending a data frame 708, then STA3 uses the MU EDCA parameters of AC_y in the low-priority (LP) EDCA parameters 736 during the time it counts down EDCA timer for AC_y. The EDCA timer for AC_y is also set by the MU EDCA parameters of AC_y in the low-priority EDCA parameters. The remaining time of the period is 738.

FIG. 34 illustrates an example embodiment 750 of a STA using multiple EDCA Functions (EDCAFs) for a single packet transmission. The network topology is as shown as FIG. 8, with P-capable STA1 having AC_x 752 and AC_y 754 which can represent any AC in the EDCA.

STA1 uses EDCAFs of AC_x and AC_y to contend for the channel to transmit Packet 1. STA1 performs backoff 756 of AC_y, and it is seen that backoff 758 of AC_x starts afterward. After backoff, the TXOP is obtained first for AC_x, then it transmits the initial transmission 760 of Packet1. However, the initial transmission of Packet1 fails and STA1 starts a backoff 762 for AC_x.

During this time AC_y is seen obtaining the TXOP and retransmitting Packet1 764 for the first time. If the 1st retransmission of Packet1 fails and AC_x obtains the next TXOP, then it retransmits 766 Packet1 for the second time.

FIG. 35 illustrates an example embodiment 770 of a STA using multiple EDCAFs for transmitting packets from one AC. The network topology and STA1 with AC_x and AC_y are the same as in FIG. 34. It should be noted that this example case may only occur when AC_x has a higher priority than AC_y.

STA1 uses EDCAFs of AC_x and AC_y to contend for the channel to transmit the packets from AC_x. As shown in the figure, a backoff 774 of AC_x commences when there may not be any packets in AC_y to transmit. STA1 obtains the TXOP first for AC_x and transmits the packets 776. Next, after its backoff 772 AC_y obtains the TXOP, and it transmits the packets 780 only from AC_x. At that time AC_x is performing a backoff 778, and if AC_x obtains the next TXOP, it keeps transmitting packets 782 from AC_x.

It is possible that the EDCAF of AC_y starts to contend for the channel to transmit the packets from AC_x if there are no packets from AC_y to transmit. The EDCAF of AC_y starts to contend for the channel to transmit the packets from AC_x if there are packets from AC_x to transmit.

Figure 36A:
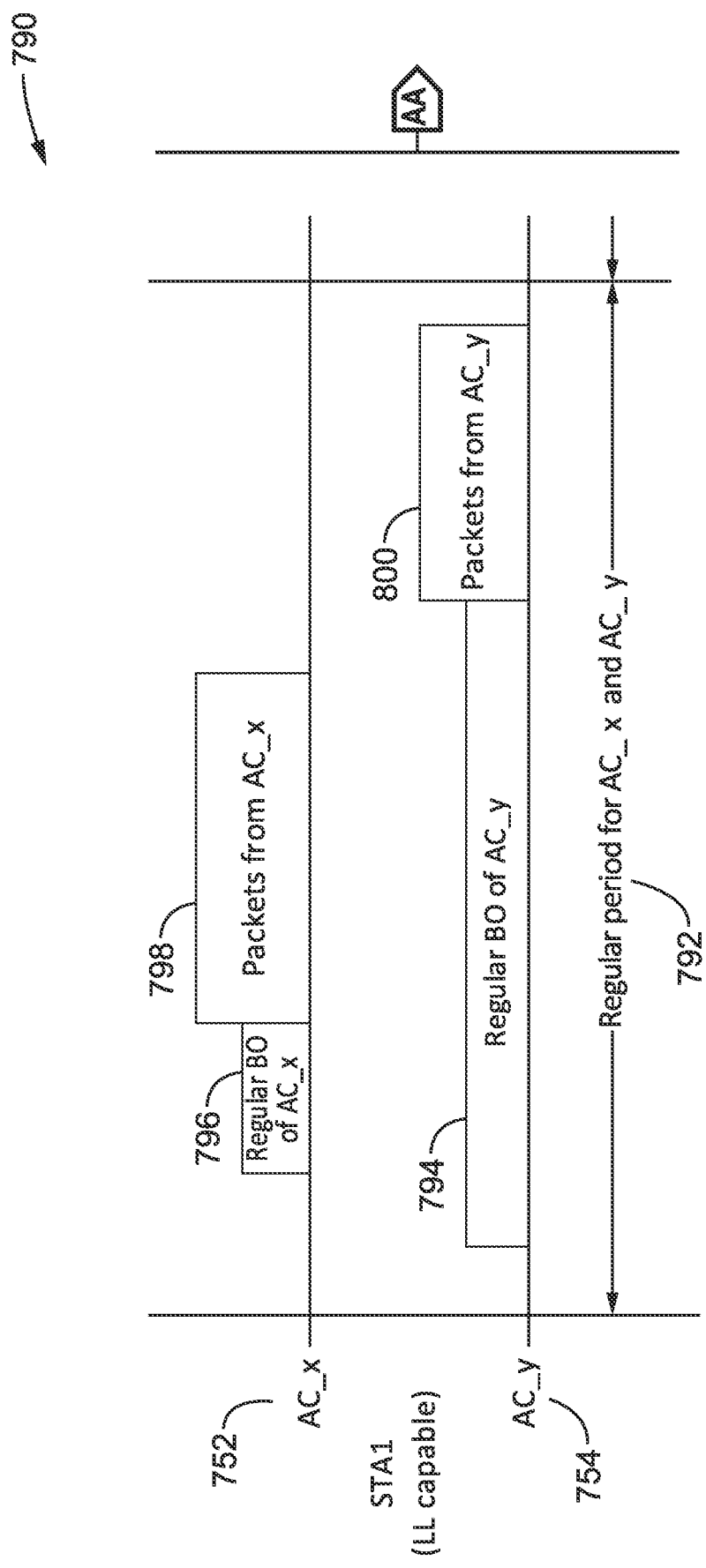
FIG. 36A and FIG. 36B is a communication sequence diagram of a STA using priority EDCA and multiple EDCAFs for transmitting packets from one AC, according to at least one embodiment of the present disclosure.
Figure 36B:
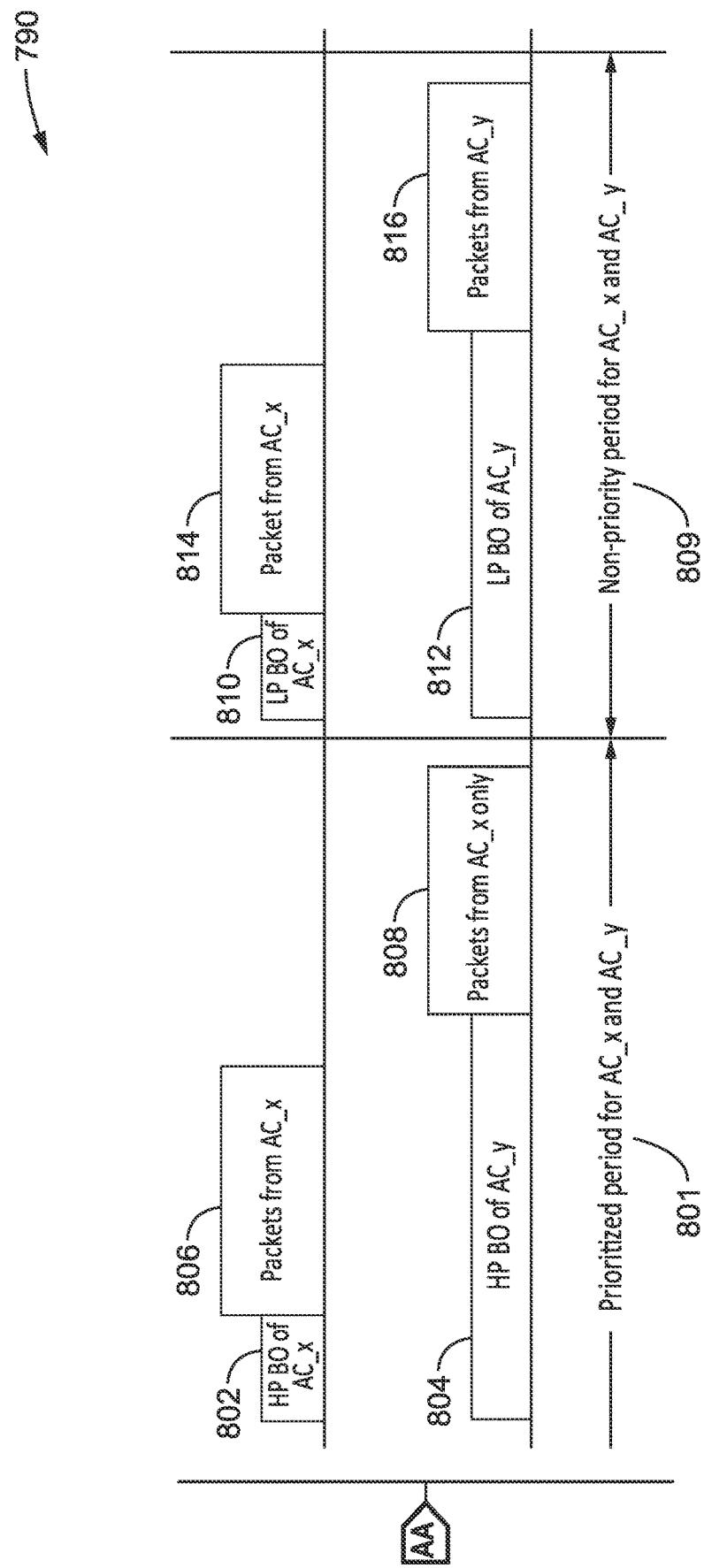

FIG. 36A and FIG. 36B illustrate an example embodiment 790 of a STA using priority EDCA and multiple EDCAFs for transmitting packets from one AC. The network topology is shown as FIG. 8, and again AC_x and AC_y can represent any AC in EDCA.

In this example STA1 is using EDCAFs of AC_x and AC_y to contend for the channel. It should be appreciated that STA1 may also use more EDCAFs of ACs to contend for the channel.

During the regular period for AC_x and AC_y seen in FIG. 36A, the EDCAFs of AC_x and AC_y perform their regular backoff 794, 796 to separately contend for the channel and obtain the TXOP for packets from AC_x and AC_y, respectively. The figure shows packets 798 sent from AC_x, then after backoff for AC_y it obtains the TXOP and sends its packets 800.

During the prioritized period 801 seen in FIG. 36B for AC_x and AC_y, there are prioritized packets only from AC_x. STA1 uses EDCAFs of AC_x and AC_y to contend for the channel to transmit the packets from AC_x. The backoffs (BO) 802 and 804 of AC_x and AC_y are created by using high-priority (HP) EDCA parameters. As shown in the figure, after backoff AC_x obtains the TXOP first, and it transmits packets 806 from AC_x. Next, AC_y obtains the TXOP, and it transmits packets 808 which are only from AC_x.

A non-priority period 809 is entered for AC_x and AC_y, the EDCAFs of AC_x and AC_y perform backoffs 810 and 812 separately to contend for the channel and obtain TXOP for the packets from AC_x and AC_y, respectively. The backoff (BO) of AC_x and AC_y in this case are created by using low-priority (LP) EDCA parameters. STA1 is seen transmitting packets from AC_x 814, and after BO 812 transmitting packets from AC_y 816.

Figure 37A:
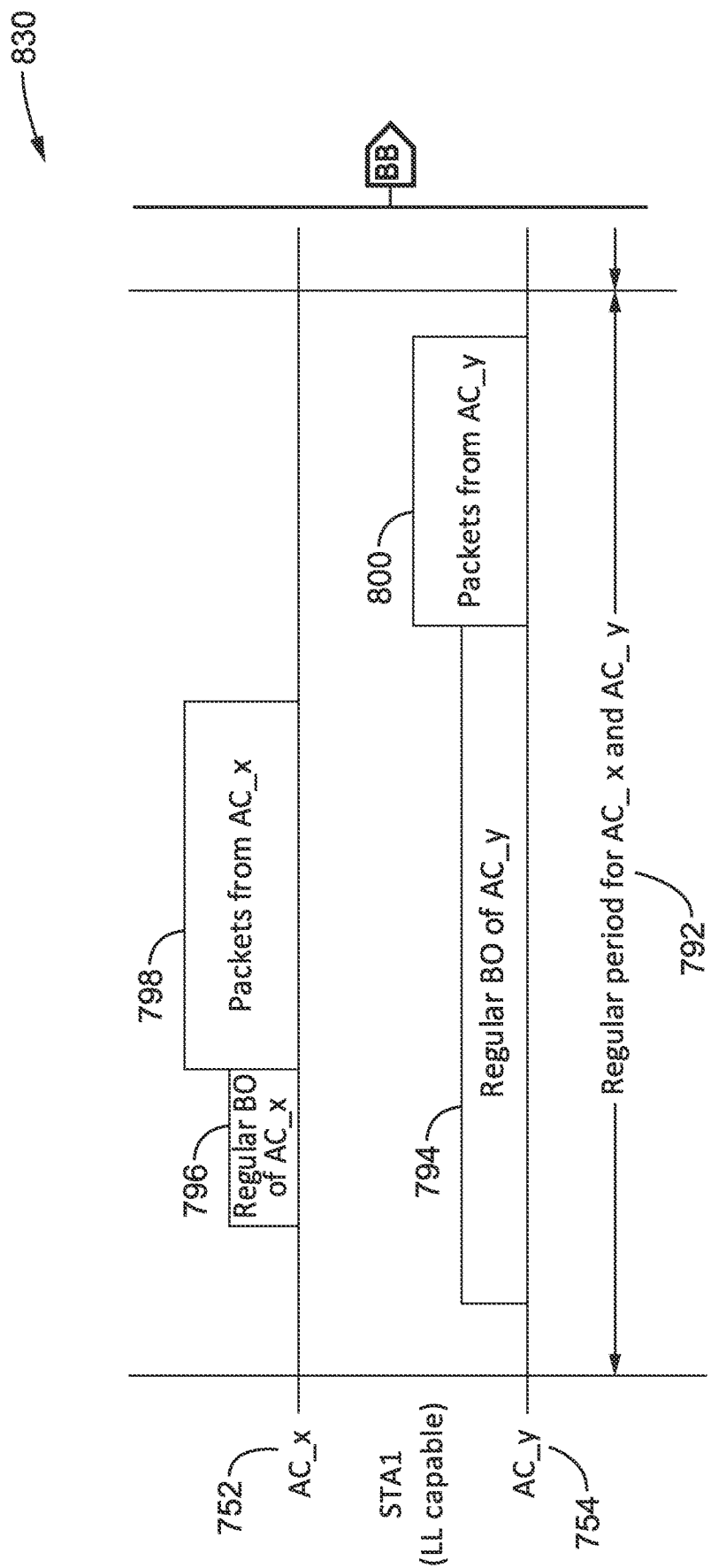
FIG. 37A and FIG. 37B is a communication sequence diagram of a STA using priority EDCA and multiple EDCAFs for transmitting packets from one AC, according to at least one embodiment of the present disclosure.
Figure 37B:
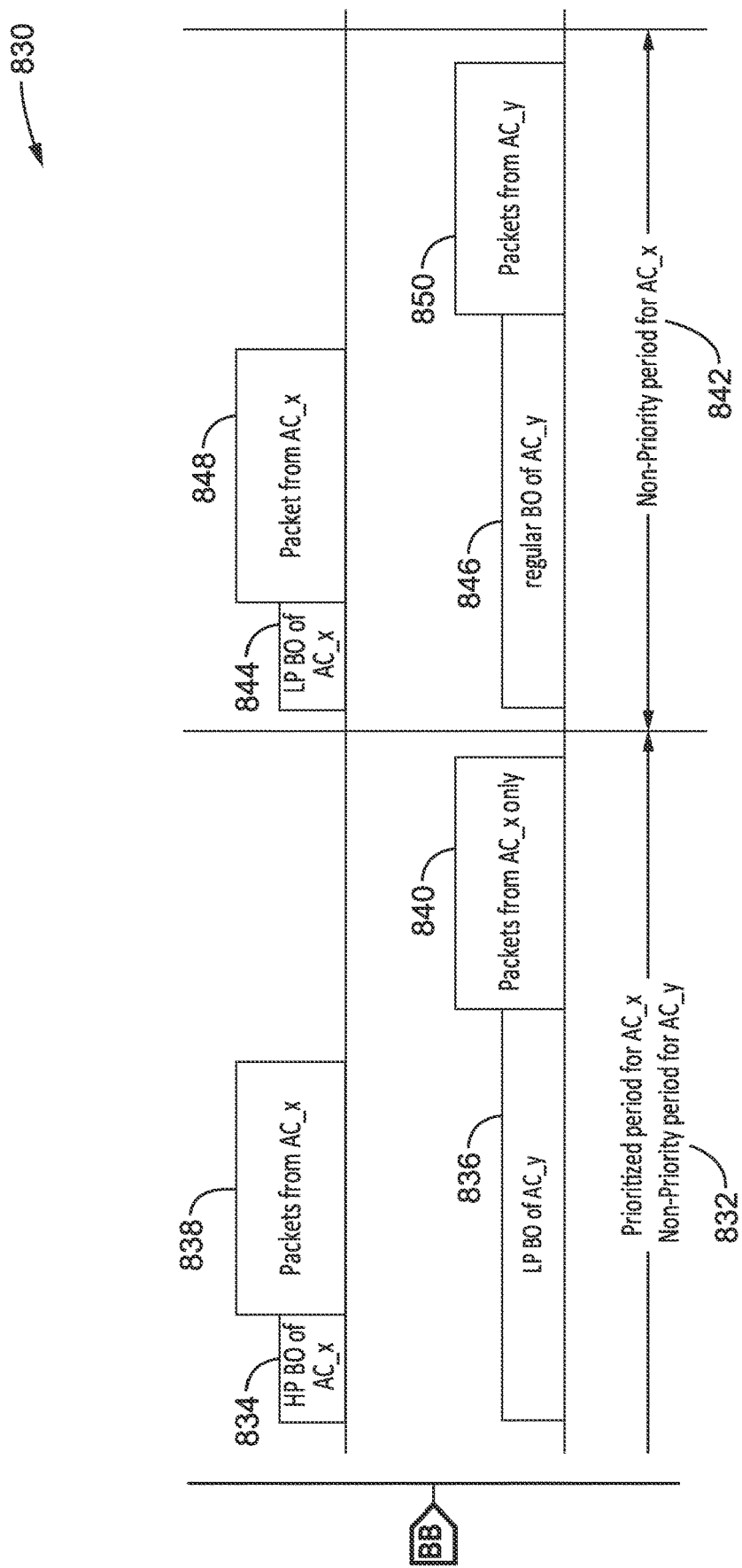

FIG. 37A and FIG. 37B illustrate an example embodiment 830 of a STA using priority EDCA and multiple EDCAFs for transmitting packets from one AC. This network topology and STA are the same as in FIG. 36A and FIG. 36B. Again, it will be noted that it is also possible for STA1 to use more EDCAFs of ACs to contend the channel.

The regular period seen in FIG. 37A is the same as that seen in FIG. 36A.

The next period 832 seen in FIG. 37B is a prioritized period for AC_x and a non-priority period for AC_y, while there are only prioritized packets from AC_x. STA1 uses EDCAFs of AC_x and AC_y to contend for the channel to transmit the packets from AC_X. The backoffs (BO) 834 and 836 of AC_x and AC_y are created by using high-priority (HP) EDCA parameters and low priority (LP) EDCA parameters, respectively. As shown in the figure, backoff of AC_x obtains the TXOP first, and then transmits packets 838 from AC_x. Next, AC_y obtains the TXOP, and it transmits packets 840 only from AC_x.

The next period 842 is a non-priority period for AC_x. The EDCAFs of AC_x and AC_y perform their backoffs 844 and 846 separately to contend for the channel and obtain the TXOP for the packets from AC_x and AC_y. The backoffs (BO) as shown in the figure) of AC_x and AC_y are created by using low-priority (LP) EDCA parameters for AC_x, and regular EDCA parameters for AC_y. STA1 first obtains TXOP for AC_x and transmits packets 848, then after the regular backoff 846 of AC_y transmits packets 850 from AC_y.

It should be noted that the non-priority period of AC_y can be any type of period.

Figure 38:
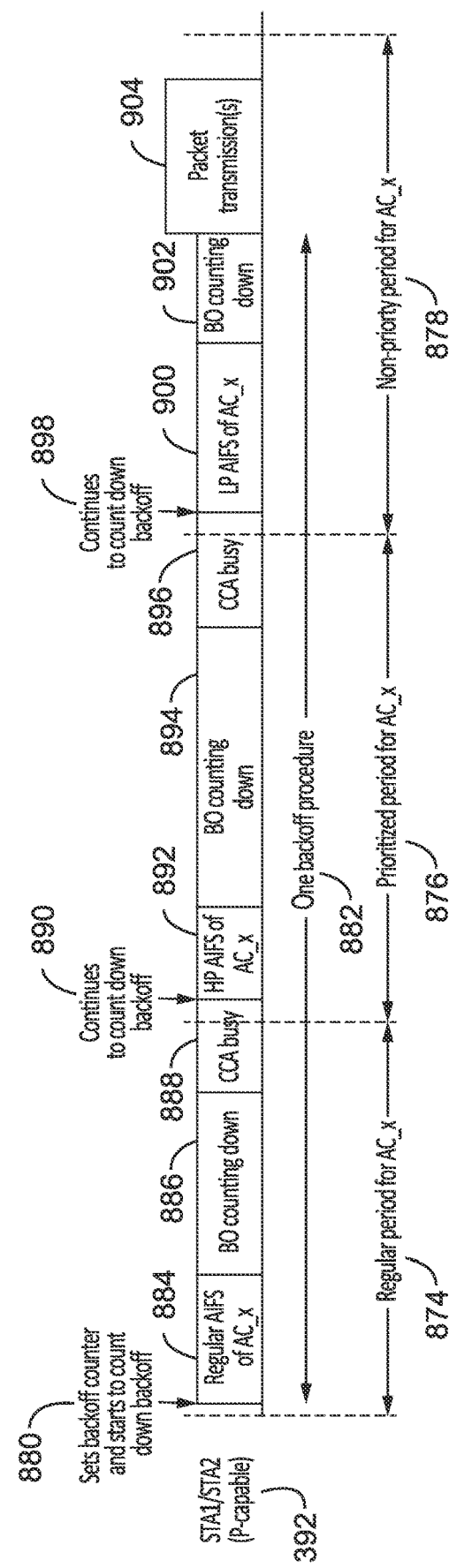
FIG. 38 is a communication sequence diagram of using different AIFSs during a backoff procedure, according to at least one embodiment of the present disclosure.

FIG. 38 illustrates an example embodiment 870 of using different AIFSs during a backoff procedure, such as in cases in which the backoff procedure crosses over different periods of EDCA parameter settings. For example consider an on-going backoff procedure, in which the STA can use different AIFSs to continue the counting down procedure. The AIFSs can be determined by the EDCA parameter settings when the STA continues the backoff. The network topology is shown as FIG. 8. The figure depicts operation during the regular period 874 for AC_x on the station (e.g., STA1 or STA2) 392 which is P-capable. The STA1/STA2 represents one P-capable STA which is either affiliated with, or not affiliated with, a MLD. STA1 or STA2 could also be replaced by an AP.

During the regular period 874 for AC_x, STA1 or STA2 invoke a backoff procedure 882 and starts to contend 880 for the channel for AC_x. The backoff can use the default EDCA parameters of AC_x to set the backoff counter of AC_x. Then it can use the AIFSN 884 in the default EDCA parameters of AC_x to start counting down the backoff 886.

The backoff counter does not count down to zero during the regular period and it is paused by a period of CCA busy 888 which crosses over the regular period 874 for AC_x and enters a prioritized period 876 for AC_x. The STA 890 with AIFSN in the high-priority EDCA parameters 892 being used for AC_x, when it continues to count down backoff 894 of AC_x during the prioritized period for AC_x.

If the backoff counter does not reach to zero in prioritized period 876 for AC_x, such as because of CCA busy 896, then the station may continue 898 counting down the backoff during a non-priority period 878 for AC_x. As there was a CCA busy during the prioritized period for AC_x, then the STA can use the AIFSN in the low-priority EDCA parameters 900 of AC_x to continue the backoff count-down 902 procedure after CCA busy. The STA is then seen performing its packet transmission 904.

5. General Embodiments

Embodiments of the present technology may be described herein with reference to flowchart illustrations of methods and systems according to embodiments of the technology, and/or procedures, algorithms, steps, operations, formulae, or other computational depictions, which may also be implemented as computer program products. In this regard, each block or step of a flowchart, and combinations of blocks (and/or steps) in a flowchart, as well as any procedure, algorithm, step, operation, formula, or computational depiction can be implemented by various means, such as hardware, firmware, and/or software including one or more computer program instructions embodied in computer-readable program code. As will be appreciated, any such computer program instructions may be executed by one or more computer processors, including without limitation a general purpose computer or special purpose computer, or other programmable processing apparatus to produce a machine, such that the computer program instructions which execute on the computer processor(s) or other programmable processing apparatus create means for implementing the function(s) specified.

Accordingly, blocks of the flowcharts, and procedures, algorithms, steps, operations, formulae, or computational depictions described herein support combinations of means for performing the specified function(s), combinations of steps for performing the specified function(s), and computer program instructions, such as embodied in computer-readable program code logic means, for performing the specified function(s). It will also be understood that each block of the flowchart illustrations, as well as any procedures, algorithms, steps, operations, formulae, or computational depictions and combinations thereof described herein, can be implemented by special purpose hardware-based computer systems which perform the specified function(s) or step(s), or combinations of special purpose hardware and computer-readable program code.

Furthermore, these computer program instructions, such as embodied in computer-readable program code, may also be stored in one or more computer-readable memory or memory devices that can direct a computer processor or other programmable processing apparatus to function in a particular manner, such that the instructions stored in the computer-readable memory or memory devices produce an article of manufacture including instruction means which implement the function specified in the block(s) of the flowchart(s). The computer program instructions may also be executed by a computer processor or other programmable processing apparatus to cause a series of operational steps to be performed on the computer processor or other programmable processing apparatus to produce a computer-implemented process such that the instructions which execute on the computer processor or other programmable processing apparatus provide steps for implementing the functions specified in the block(s) of the flowchart(s), procedure (s) algorithm(s), step(s), operation(s), formula(e), or computational depiction(s).

It will further be appreciated that the terms "programming" or "program executable" as used herein refer to one or more instructions that can be executed by one or more computer processors to perform one or more functions as described herein. The instructions can be embodied in software, in firmware, or in a combination of software and firmware. The instructions can be stored local to the device in non-transitory media, or can be stored remotely such as on a server, or all or a portion of the instructions can be stored locally and remotely. Instructions stored remotely can be downloaded (pushed) to the device by user initiation, or automatically based on one or more factors.

It will further be appreciated that as used herein, that the terms processor, hardware processor, computer processor, central processing unit (CPU), and computer are used synonymously to denote a device capable of executing the instructions and communicating with input/output interfaces and/or peripheral devices, and that the terms processor, hardware processor, computer processor, CPU, and computer are intended to encompass single or multiple devices, single core and multicore devices, and variations thereof.

From the description herein, it will be appreciated that the present disclosure encompasses multiple implementations of the technology which include, but are not limited to, the following:

An apparatus for wireless communication in a network, the apparatus comprising: (a) a wireless communication circuit, as a wireless station (STA) operating as either an Access Point (AP) or a non-AP STA, is configured for wirelessly communicating over a channel with other wireless stations (STAs), which are either APs or non-AP STAs, on a wireless local area network (WLAN) in which Carrier Sense Multiple Access/Collision Avoidance (CSMA/CA) is applied; (b) a processor coupled to said wireless communication circuit for operating on the WLAN as a STA; (c) a non-transitory memory storing instructions executable by the processor for communicating with other STAs; and (d) wherein said instructions, when executed by the processor, perform one or more steps comprising: (d)(i) configuring EDCA functions to operate with multiple sets of single EDCA or Multiple-User (MU) EDCA operating parameters providing a range of priority levels, wherein each set of operating parameters provides different levels of nominal access time for use by the STA at different periods of time when contending for said at least one channel; (d)(ii) utilizing a higher-priority set of single EDCA or Multiple-User (MU) EDCA operating parameters when the STA needs to speed up channel access; and (d)(iii) utilizing a lower-priority set of EDCA operating parameters when the STA needs to slow down channel access.

An apparatus for wireless communication in a network, the apparatus comprising: (a) a wireless communication circuit, as a wireless station (STA) operating as either an Access Point (AP) or a non-AP STA, is configured for wirelessly communicating over a channel with other wireless stations (STAs), which are either APs or non-AP STAs, on a wireless local area network (WLAN) in which Carrier Sense Multiple Access/Collision Avoidance (CSMA/CA) is applied; (b) a processor coupled to said wireless communication circuit for operating on the WLAN as a STA; (c) a non-transitory memory storing instructions executable by the processor for communicating with other STAs; and (d) wherein said instructions, when executed by the processor, perform one or more steps comprising: (d)(i) configuring EDCA functions to operate with multiple sets of single EDCA or Multiple-User (MU) EDCA operating parameters providing a range of priority levels, wherein each set of operating parameters provides different levels of nominal access time for use by the STA at different periods of time when contending for said at least one channel; (d)(ii) said multiple sets of single EDCA or MU-EDCA operating parameters include a backoff slot duration parameter, allowing backoff slot duration to be set dynamically in response to changing between said multiple sets of single EDCA or MU-EDCA operating parameters; (d)(iii) utilizing a higher-priority set of single EDCA or Multiple-User (MU) EDCA operating parameters when the STA needs to speed up channel access by shortening nominal channel access time; (d)(iv) utilizing a lower-priority set of EDCA operating parameters when the STA needs to slow down channel access toward providing a recompense for utilizing a higher-priority set of EDCA operating parameters; (d)(v) where said STA is configured for utilizing single EDCA or MU-EDCA operating parameters of different priority levels at the same time for backoff on different ACs; and (d) (vi) limiting a duration of time that said STA can contiguously use a higher-priority single EDCA or MU-EDCA operating parameter set for an access category (AC).

A method of wireless communication in a network, the apparatus comprising: (a) a wireless communication circuit having a processor configured for executing a protocol for a wireless station (STA) to communicate over a channel with other wireless stations (STAs), which are either APs or non-AP STAs, on a wireless local area network (WLAN) in which Carrier Sense Multiple Access/Collision Avoidance (CSMA/CA) is applied; (b) configuring EDCA functions to operate with multiple sets of single EDCA or Multiple-User (MU) EDCA operating parameters providing a range of priority levels, wherein each set of operating parameters provides different levels of nominal access time for use by the STA at different periods of time when contending for said at least one channel; (c) utilizing a higher-priority set of single EDCA or Multiple-User (MU) EDCA operating parameters when the STA needs to speed up channel access; and (d) utilizing a lower-priority set of EDCA operating parameters when the STA needs to slow down channel access.

A Wireless communication apparatus performing transmission of packets, where CSMA/CA is applied in which STAs have one default set of EDCA parameters, comprising: (a) a STA has the multiple sets of EDCA parameters and uses them at different periods of time; (b) STA uses a high-priority set of EDCA parameters when it needs to speed up channel access compared with the default set; and (c) STA uses a low-priority set of EDCA parameters when it needs to slow down channel access compared with the default set.

The apparatus or method of any preceding implementation, wherein utilizing the higher-priority set of single EDCA or Multiple-User (MU) EDCA operating parameters shortens nominal channel access time for prioritized traffic transmissions.

The apparatus or method of any preceding implementation, wherein said instructions when executed by the processor further perform steps comprising said STA switching to a lower-priority set of single EDCA or MU-EDCA operating parameters toward providing a recompense for utilizing a higher-priority set of EDCA operating parameters.

The apparatus or method of any preceding implementation, wherein said instructions when executed by the processor further perform steps comprising limiting a duration of time that said STA can contiguously use a higher-priority single EDCA or MU-EDCA operating parameter set for an access category (AC).

The apparatus or method of any preceding implementation, wherein said multiple operating parameter sets comprise a regular operating parameter set with a default priority, a High-Priority (HP) operating parameter set, and a Low-Priority (LP) operating parameter set.

The apparatus or method of any preceding implementation, wherein said regular operating parameter set is loaded to match default single EDCA and Multiple-User (MU) EDCA parameters settings of an IEEE 802.11ax protocol.

The apparatus or method of any preceding implementation, wherein said multiple sets of single EDCA or MU-EDCA operating parameters is set by a communication received from an associated with said STA.

The apparatus or method of any preceding implementation, wherein said multiple sets of single EDCA or MU-EDCA operating parameters are set by a communication from the STAs associated AP, through utilizing a beacon frame, a probe response frame, or a (re)association response frame.

The apparatus or method of any preceding implementation, wherein said instructions when executed by the processor further perform steps comprising said multiple sets of single EDCA or MU-EDCA operating parameters include a backoff slot duration parameter, allowing backoff slot duration to be set dynamically in response to changing between said multiple sets of single EDCA or MU-EDCA operating parameters.

The apparatus or method of any preceding implementation, wherein said multiple sets of single EDCA or MU-EDCA operating parameters can be set in response to receiving a frame in a communications.

The apparatus of claim 1, wherein said instructions when executed by the processor further perform steps comprising said STA using single EDCA or MU-EDCA operating parameters of different priority levels at the same time for backoff on different ACs.

The apparatus or method of any preceding implementation, wherein said instructions when executed by the processor further perform steps comprising said station operating as an AP utilizing one set of single EDCA or MU-EDCA operating parameters during a period while utilizing multiple EDCA functions to contend for the channel and obtain TXOP for transmitting packets from a single AC.

The apparatus or method of any preceding implementation, wherein said instructions when executed by the processor further perform steps comprising forcing said STA, which has been utilizing a higher-priority set of single EDCA or MU-EDCA operating parameters, to use a lower-priority set of operating parameters for a period of time toward compensating for its prior higher-priority usage.

The apparatus or method of any preceding implementation, where STA having multiple sets of EDCA parameters could be set by its associated AP via a beacon frame The apparatus or method of any preceding implementation, where the STA having multiple sets of EDCA parameters could be set by AP via a probe response frame The apparatus or method of any preceding implementation, where the STA having multiple sets of EDCA parameters could be set by its associated AP via a (re)association response frame.

The apparatus or method of any preceding implementation, where the STA having multiple sets of EDCA parameters could set the backoff slot duration dynamically.

The apparatus or method of any preceding implementation, where the STA having multiple sets of EDCA parameters could be set by a frame transmitted over other link.

The apparatus or method of any preceding implementation, where STA having multiple sets of EDCA parameters could use the low-priority set of EDCA parameters of an AC and the high-priority set of EDCA and MU EDCA parameters of another AC at the same time.

The apparatus or method of any preceding implementation, where STA using the high-priority set of EDCA parameters could be forced to use low-priority set of EDCA parameters for a period of time after it uses the high-priority set of EDCA parameters.

The apparatus or method of any preceding implementation, where AP using one set of EDCA parameters during a period could use multiple EDCAFs to contend the channel and obtain TXOP for transmitting packets from one AC only.

As used herein, term "implementation" is intended to include, without limitation, embodiments, examples, or other forms of practicing the technology described herein.

As used herein, the singular terms "a," "an," and "the" may include plural referents unless the context clearly dictates otherwise. Reference to an object in the singular is not intended to mean "one and only one" unless explicitly so stated, but rather "one or more."

Phrasing constructs, such as "A, B and/or C", within the present disclosure describe where either A, B, or C can be present, or any combination of items A, B and C. Phrasing constructs indicating, such as "at least one of" followed by listing a group of elements, indicates that at least one of these group elements is present, which includes any possible combination of the listed elements as applicable.

References in this disclosure referring to "an embodiment", "at least one embodiment" or similar embodiment wording indicates that a particular feature, structure, or characteristic described in connection with a described embodiment is included in at least one embodiment of the present disclosure. Thus, these various embodiment phrases are not necessarily all referring to the same embodiment, or to a specific embodiment which differs from all the other embodiments being described. The embodiment phrasing should be construed to mean that the particular features, structures, or characteristics of a given embodiment may be combined in any suitable manner in one or more embodiments of the disclosed apparatus, system or method.

As used herein, the term "set" refers to a collection of one or more objects. Thus, for example, a set of objects can include a single object or multiple objects.

Relational terms such as first and second, top and bottom, and the like may be used solely to distinguish one entity or action from another entity or action without necessarily requiring or implying any actual such relationship or order between such entities or actions.

The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element.

As used herein, the terms "approximately", "approximate", "substantially", "essentially", and "about", or any other version thereof, are used to describe and account for small variations. When used in conjunction with an event or circumstance, the terms can refer to instances in which the event or circumstance occurs precisely as well as instances in which the event or circumstance occurs to a close approximation. When used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially" aligned can refer to a range of angular variation of less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°.

Additionally, amounts, ratios, and other numerical values may sometimes be presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

The term "coupled" as used herein is defined as connected, although not necessarily directly and not necessarily mechanically. A device or structure that is "configured" in a certain way is configured in at least that way, but may also be configured in ways that are not listed.

Benefits, advantages, solutions to problems, and any element(s) that may cause any benefit, advantage, or solution to occur or become more pronounced are not to be construed as a critical, required, or essential features or elements of the technology describes herein or any or all the claims.

In addition, in the foregoing disclosure various features may be grouped together in various embodiments for the purpose of streamlining the disclosure. This method of disclosure is not to be interpreted as reflecting an intention that the claimed embodiments require more features than are expressly recited in each claim. Inventive subject matter can lie in less than all features of a single disclosed embodiment.

The abstract of the disclosure is provided to allow the reader to quickly ascertain the nature of the technical disclosure. It is submitted with the understanding that it will not be used to interpret or limit the scope or meaning of the claims.

It will be appreciated that the practice of some jurisdictions may require deletion of one or more portions of the disclosure after that application is filed. Accordingly the reader should consult the application as filed for the original content of the disclosure. Any deletion of content of the disclosure should not be construed as a disclaimer, forfeiture or dedication to the public of any subject matter of the application as originally filed.

The following claims are hereby incorporated into the disclosure, with each claim standing on its own as a separately claimed subject matter.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

TABLE 1A

Example of Regular EDCA/MU EDCA parameter Settings

Regular/Default Settings

|   |   | AC_VO | AC_VI | AC_BE | AC_BK | AC_NEW |
|---|---|---|---|---|---|---|
| EDCA | AIFSN | 2 | 2 | 3 | 7 | 2 |
|  | $CW_{min}$ | 3 | 7 | 15 | 15 | 3 |
|  | $CW_{max}$ | 7 | 15 | 1023 | 1023 | 15 |
|  | BO uS | 20 uS | 20 uS | 20 uS | 20 uS | 20 uS |
|  | TXOP | 2.080 | 4.096 | 2.528 | 2.528 | 2.528 |
|  | EDCA timer (mS) | N/A | N/A | N/A | N/A | N/A |
| MU-EDCA | AIFSN | 3 | 3 | 7 | 7 | 2 |
|  | $CW_{min}$ | 3 | 7 | 15 | 15 | 3 |
|  | $CW_{max}$ | 7 | 15 | 1023 | 1023 | 15 |
|  | MU-EDCA timer (mS) | 2.080 | 4.096 | 2.528 | 2.528 | 2.528 |

"BO"—Backoff Slot Duration (in uS);
"TXOP"—TXOP timer (mS)

TABLE 1B

Example of High Priority EDCA/MU EDCA parameter Settings

High Priority Settings

|   |   | AC_VO | AC_VI | AC_BE | AC_BK | AC_NEW |
|---|---|---|---|---|---|---|
| EDCA | AIFSN | 1 | 2 | 3 | 7 | 2 |
|  | $CW_{min}$ | 3 | 3 | 15 | 15 | 3 |
|  | $CW_{max}$ | 7 | 7 | 1023 | 1023 | 15 |
|  | BO uS | 20 uS | 20 uS | 20 uS | 20 uS | 20 uS |
|  | TXOP | 2.080 | 4.096 | 2.528 | 2.528 | 2.528 |
|  | EDCA timer (mS) | 4 | 4 | 0 | 0 | 0 |
| MU-EDCA | AIFSN | 2 | 3 | 7 | 7 | 3 |
|  | $CW_{min}$ | 3 | 3 | 15 | 15 | 3 |
|  | $CW_{max}$ | 7 | 7 | 1023 | 1023 | 15 |
|  | MU-EDCA timer (mS) | 2.080 | 4.096 | 2.528 | 2.528 | 2.528 |

"BO"—Backoff Slot Duration (in uS);
"TXOP"—TXOP timer (mS)

TABLE 1C

Example of Low Priority EDCA/MU EDCA parameter Settings

Low Priority Settings

|   |   | AC_VO | AC_VI | AC_BE | AC_BK | AC_NEW |
|---|---|---|---|---|---|---|
| EDCA | AIFSN | 2 | 2 | 3 | 7 | 2 |
|  | $CW_{min}$ | 7 | 7 | 15 | 15 | 3 |
|  | $CW_{max}$ | 15 | 15 | 1023 | 1023 | 15 |
|  | BO uS | 20 uS | 40 uS | 20 uS | 20 uS | 20 uS |
|  | TXOP | 2.080 | 2.080 | 2.528 | 2.528 | 2.528 |
|  | EDCA timer (mS) | 4 | 4 | 0 | 0 | 0 |
| MU-EDCA | AIFSN | 3 | 3 | 7 | 7 | 3 |
|  | $CW_{min}$ | 7 | 7 | 15 | 15 | 3 |
|  | $CW_{max}$ | 15 | 15 | 1023 | 1023 | 15 |
|  | MU-EDCA timer (mS) | 2.080 | 2.080 | 2.528 | 2.528 | 2.528 |

"BO"—Backoff Slot Duration (in uS);
"TXOP"—TXOP timer (mS)

What is claimed is:

1. An apparatus for wireless communication in a network, the apparatus comprising:
  (a) a wireless communication circuit, as a wireless station (STA) operating as either an Access Point (AP) or a non-AP STA, is configured for wirelessly communicating over a channel with other wireless stations (STAs), which are either APs or non-AP STAs, on a wireless local area network (WLAN) in which Carrier Sense Multiple Access/Collision Avoidance (CSMA/CA) is applied;
  (b) a processor coupled to said wireless communication circuit for operating on the WLAN as a STA;
  (c) a non-transitory memory storing instructions executable by the processor for communicating with other STAs; and
  (d) wherein said instructions, when executed by the processor, perform one or more steps comprising:
    (i) wherein a priority-capable STA, having EDCA functions configured to operate with multiple predetermined sets of single EDCA or Multiple-User (MU) EDCA operating parameters for each access class (AC) of EDCA, providing a range of priority levels, wherein each predetermined set of operating parameters provides different levels of nominal access time for use by the STA at different periods of time when contending for said at least one channel;
    (ii) wherein said priority-capable STA determines from the data that a priority period is required for transmission, and switches to utilizing a predetermined set of higher-priority set of single EDCA or Multiple-User (MU) EDCA operating parameters in a given AC, from said multiple predetermined sets of single EDCA or Multiple-User (MU) EDCA operating parameters, when the STA needs to speed up channel access for this higher priority traffic; and
    (iii) wherein said priority-capable STA utilizes a predetermined set of lower-priority set of EDCA operating parameters in a given AC, from said multiple predetermined sets of single EDCA or Multiple-User (MU) EDCA operating parameters, when the STA needs to slow down channel access for lower priority traffic and for keeping channel access equitable between stations in the network.

2. The apparatus of claim 1, wherein utilizing the predetermined higher-priority set of single EDCA or Multiple-User (MU) EDCA operating parameters shortens nominal channel access time for prioritized traffic transmissions.

3. The apparatus of claim 1, wherein said instructions when executed by the processor further perform steps comprising said STA switching to a predetermined lower-priority set of single EDCA or MU-EDCA operating parameters toward providing a recompense for utilizing a higher-priority set of EDCA operating parameters.

4. The apparatus of claim 1, wherein said instructions when executed by the processor further perform steps comprising limiting a duration of time that said STA can contiguously use a predetermined higher-priority single EDCA or MU-EDCA operating parameter set for an access category (AC).

5. The apparatus of claim 1, wherein said multiple predetermined operating parameter sets comprise a predetermined regular operating parameter set with a default priority, a predetermined High-Priority (HP) operating parameter set, and a predetermined Low-Priority (LP) operating parameter set.

6. The apparatus of claim 5, wherein said predetermined regular operating parameter set is loaded to match default single EDCA and Multiple-User (MU) EDCA parameters settings of an IEEE 802.11ax protocol.

7. The apparatus of claim 1, wherein said multiple predetermined sets of single EDCA or MU-EDCA operating parameters can be updated by a communication received from an associated STA.

8. The apparatus of claim 1, wherein said multiple predetermined sets of single EDCA or MU-EDCA operating parameters are set by a communication from the STAs associated AP, through utilizing a beacon frame, a probe response frame, or a (re)association response frame.

9. The apparatus of claim 1, wherein said instructions when executed by the processor further perform steps comprising said multiple predetermined sets of single EDCA or MU-EDCA operating parameters include a backoff slot duration parameter, allowing backoff slot duration to be set dynamically in response to changing between said multiple predetermined sets of single EDCA or MU-EDCA operating parameters.

10. The apparatus of claim 1, wherein said multiple predetermined sets of single EDCA or MU-EDCA operating parameters can be set in response to receiving a frame in a communications.

11. The apparatus of claim 1, wherein said instructions when executed by the processor further perform steps comprising said STA using single EDCA or MU-EDCA operating parameters of different priority levels, from the multiple predetermined sets of single EDCA or Multiple-User (MU) EDCA operating parameters, at the same time for backoff on different ACs.

12. The apparatus of claim 1, wherein said instructions when executed by the processor further perform steps comprising said station operating as an AP utilizing one set of single EDCA or MU-EDCA operating parameters, from the multiple predetermined sets of single EDCA or Multiple-User (MU) EDCA operating parameters, during a period while utilizing multiple EDCA functions to contend for the channel and obtain TXOP for transmitting packets from a single AC.

13. The apparatus of claim 1, wherein said instructions when executed by the processor further perform steps comprising forcing said STA, which has been utilizing a predetermined higher-priority set of single EDCA or MU-EDCA operating parameters, to use a predetermined lower-priority set of operating parameters for a period of time toward compensating for its prior higher-priority usage.

14. An apparatus for wireless communication in a network, the apparatus comprising:
  (a) a wireless communication circuit, as a wireless station (STA) operating as either an Access Point (AP) or a non-AP STA, is configured for wirelessly communicating over a channel with other wireless stations (STAs), which are either APs or non-AP STAs, on a wireless local area network (WLAN) in which Carrier Sense Multiple Access/Collision Avoidance (CSMA/CA) is applied;
  (b) a processor coupled to said wireless communication circuit for operating on the WLAN as a STA;
  (c) a non-transitory memory storing instructions executable by the processor for communicating with other STAs; and
  (d) wherein said instructions, when executed by the processor, perform one or more steps comprising:
    (i) wherein a priority-capable STA, having EDCA functions configured to operate with multiple predetermined sets of single EDCA or Multiple-User (MU) EDCA operating parameters for each access class (AC) of EDCA, providing a range of priority levels, wherein each predetermined set of operating parameters provides different levels of nominal access time for use by the STA at different periods of time when contending for said at least one channel;

(ii) said multiple predetermined sets of single EDCA or MU-EDCA operating parameters include a backoff slot duration parameter, allowing backoff slot duration to be set dynamically in response to changing between said multiple sets of single EDCA or MU-EDCA operating parameters;

(iii) wherein said priority-capable STA determines from the data that a priority period is required for transmission, and switches to utilizing a predetermined higher-priority set of single EDCA or Multiple-User (MU) EDCA operating parameters in a given AC, when the STA needs to speed up channel access by shortening nominal channel access time;

(iv) wherein said priority-capable STA utilizes a predetermined lower-priority set of EDCA operating parameters in a given AC, when the STA needs to slow down channel access toward providing a recompense, or precompense, for utilizing a predetermined higher-priority set of EDCA operating parameters;

(v) where said STA is configured for utilizing single EDCA or MU-EDCA operating parameters of different priority levels at the same time for backoff on different ACs; and (vi) limiting a duration of time that said STA can contiguously use a predetermined higher-priority single EDCA or MU-EDCA operating parameter set for an access category (AC).

15. The apparatus of claim 14, wherein said multiple predetermined operating parameter sets comprise a predetermined regular operating parameter set with a default priority, a predetermined High-Priority (HP) operating parameter set, and a predetermined Low-Priority (LP) operating parameter set.

16. The apparatus of claim 15, wherein said predetermined regular operating parameter set is loaded to match default single EDCA and Multiple-User (MU) EDCA parameters settings of an IEEE 802.11ax protocol.

17. The apparatus of claim 14, wherein said multiple predetermined sets of single EDCA or MU-EDCA operating parameters are established by a communication received from an AP associated with said STA.

18. He apparatus of claim 14, wherein said multiple predetermined sets of single EDCA or MU-EDCA operating parameters are established by a communication from the STAs associated AP, through utilizing a beacon frame, a probe response frame, or a (re)association response frame.

19. The apparatus of claim 14, wherein said multiple predetermined sets of single EDCA or MU-EDCA operating parameters can be established in response to receiving a frame in a communications.

20. A method of wireless communication in a network, the method comprising:

(a) a wireless communication circuit having a processor configured for executing a protocol for a priority-capable wireless station (STA) to communicate over a channel with other wireless stations (STAs), which are either APs or non-AP STAs, on a wireless local area network (WLAN) in which Carrier Sense Multiple Access/Collision Avoidance (CSMA/CA) is applied;

(b) operating said priority-capable STA with EDCA functions to operate with multiple predetermined sets of single EDCA or Multiple-User (MU) EDCA operating parameters for each access class (AC) of EDCA for providing a range of priority levels, wherein each predetermined set of operating parameters provides different levels of nominal access time for use by the STA at different periods of time when contending for said at least one channel;

(c) wherein said priority-capable STA determines from the data that a priority period is required for transmission, and switches to utilizing a predetermined higher-priority set of single EDCA or Multiple-User (MU) EDCA operating parameters in a given AC, from said multiple predetermined sets of single EDCA or Multiple-User (MU) EDCA operating parameters, when the STA needs to speed up channel access; and (d) wherein said priority-capable STA utilizes a predetermined lower-priority set of EDCA operating parameters in a given AC, from said multiple predetermined sets of single EDCA or Multiple-User (MU) EDCA operating parameters, when the STA needs to slow down channel access for lower priority traffic and for keeping channel access equitable between stations in the network.

* * * * *